(12) United States Patent
Fahlgren et al.

(10) Patent No.: US 9,246,694 B1
(45) Date of Patent: Jan. 26, 2016

(54) SYSTEM AND METHOD FOR MANAGING CONFERENCING IN A DISTRIBUTED COMMUNICATION NETWORK

(71) Applicant: Twilio, Inc., San Francisco, CA (US)

(72) Inventors: Christer Fahlgren, San Francisco, CA (US); Nico Acosta Amador, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/791,759

(22) Filed: Jul. 6, 2015

Related U.S. Application Data

(60) Provisional application No. 62/021,641, filed on Jul. 7, 2014.

(51) Int. Cl.
*H04M 3/56* (2006.01)
*H04N 7/15* (2006.01)
*H04L 12/18* (2006.01)
(Continued)

(52) U.S. Cl.
CPC ........ *H04L 12/1827* (2013.01); *H04L 12/1818* (2013.01); *H04L 12/1822* (2013.01); *H04L 65/1006* (2013.01); *H04L 65/403* (2013.01); *H04W 80/12* (2013.01)

(58) Field of Classification Search
CPC ............ H04L 65/1006; H04L 12/1822; H04L 65/1093; H04L 12/18; H04M 3/567
USPC .............................. 370/260, 329; 379/202.01
See application file for complete search history.

(56) References Cited

U.S. PATENT DOCUMENTS

| 5,274,700 A | 12/1993 | Gechter et al. |
| 5,526,416 A | 6/1996 | Dezonno et al. |
| 5,581,608 A | 12/1996 | Jreij et al. |

(Continued)

FOREIGN PATENT DOCUMENTS

| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

(Continued)

*Primary Examiner* — Asad Nawaz
*Assistant Examiner* — Jason Harley
(74) *Attorney, Agent, or Firm* — Jeffrey Schox

(57) ABSTRACT

Systems and methods for a conferencing system. Responsive to a new conference request received at a conference orchestration service, participants of the conference and participant regions for each determined participant are determined. A mixer topology is generated that specifies an assignment of each determined participant to at least one input channel of a plurality of mixers. A mixer state manager generates the mixer topology based on the determined participant regions and at least one regional association of a mixer. Media of each determined participant is routed to the assigned at least one input channel according to the generated mixer topology by using the conference orchestration service. The mixer state manager generates the topology responsive to a request provided by the conference state manager. The conference orchestration service receives the generated mixer topology from the mixer state manager via the conference state manager.

20 Claims, 16 Drawing Sheets

(51) Int. Cl.
*H04L 29/06* (2006.01)
*H04W 80/12* (2009.01)

(56) References Cited

U.S. PATENT DOCUMENTS

| | | | |
|---|---|---|---|
| 5,598,457 A | 1/1997 | Foladare et al. |
| 5,934,181 A | 8/1999 | Adamczewski |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,269,336 B1 | 7/2001 | Ladd et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Johnson et al. |
| 6,501,739 B1 * | 12/2002 | Cohen ............... H04L 29/06 370/260 |
| 6,501,832 B1 | 12/2002 | Saylor et al. |
| 6,507,875 B1 | 1/2003 | Mellen-Garnett et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,715,547 B2 | 5/2010 | Ibbotson et al. |
| 7,875,836 B2 | 1/2011 | Imura et al. |
| 7,882,253 B2 | 2/2011 | Pardo-Castellote et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |

(56) References Cited

U.S. PATENT DOCUMENTS

| | | |
|---|---|---|
| 8,069,096 B1 | 11/2011 | Ballaro et al. |
| 8,081,958 B2 | 12/2011 | Soderstroem et al. |
| 8,103,725 B2 | 1/2012 | Gupta et al. |
| 8,126,128 B1 | 2/2012 | Hicks, III et al. |
| 8,150,918 B1 | 4/2012 | Edelman et al. |
| 8,156,213 B1 | 4/2012 | Deng et al. |
| 8,196,133 B2 | 6/2012 | Kakumani et al. |
| 8,243,889 B2 | 8/2012 | Taylor et al. |
| 8,266,327 B2 | 9/2012 | Kumar et al. |
| 8,306,021 B2 | 11/2012 | Lawson et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,594,626 B1 | 11/2013 | Woodson et al. |
| 8,611,338 B2 | 12/2013 | Lawson et al. |
| 8,649,268 B2 | 2/2014 | Lawson et al. |
| 8,667,056 B1 | 3/2014 | Proulx et al. |
| 8,755,376 B2 | 6/2014 | Lawson et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 9,014,664 B2 | 4/2015 | Kim et al. |
| 9,015,702 B2 | 4/2015 | Bhat |
| 2001/0038624 A1 | 11/2001 | Greenberg et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0123640 A1 | 7/2003 | Roelle et al. |
| 2003/0211842 A1 | 11/2003 | Kempf et al. |
| 2003/0231647 A1 | 12/2003 | Petrovykh |
| 2004/0008635 A1* | 1/2004 | Nelson ............ H04N 7/152 370/260 |
| 2004/0011690 A1 | 1/2004 | Marfino et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0091572 A1 | 4/2005 | Gavrilescu et al. |
| 2005/0125251 A1 | 6/2005 | Berger et al. |
| 2005/0135578 A1 | 6/2005 | Ress et al. |
| 2005/0141500 A1 | 6/2005 | Bhandari et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | McQueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0149166 A1 | 6/2007 | Turcotte et al. |
| 2007/0153711 A1 | 7/2007 | Dykas et al. |
| 2007/0192629 A1 | 8/2007 | Saito |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0293200 A1 | 12/2007 | Roundtree et al. |
| 2008/0005275 A1 | 1/2008 | Overton et al. |
| 2008/0037746 A1 | 2/2008 | Dufrene et al. |
| 2008/0040484 A1 | 2/2008 | Yardley |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0201426 A1* | 8/2008 | Darcie ............ H04L 65/602 709/204 |
| 2008/0209050 A1 | 8/2008 | Li |
| 2008/0222656 A1 | 9/2008 | Lyman |
| 2008/0232574 A1 | 9/2008 | Baluja et al. |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |

(56) References Cited

U.S. PATENT DOCUMENTS

| | | |
|---|---|---|
| 2009/0075684 A1 | 3/2009 | Cheng et al. |
| 2009/0089352 A1* | 4/2009 | Davis ............... G06Q 10/00 709/201 |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0300194 A1 | 12/2009 | Ogasawara |
| 2009/0318112 A1 | 12/2009 | Vasten |
| 2010/0037204 A1 | 2/2010 | Lin et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0281108 A1 | 11/2010 | Cohen |
| 2010/0291910 A1 | 11/2010 | Sanding et al. |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0274111 A1 | 11/2011 | Narasappa et al. |
| 2011/0276892 A1 | 11/2011 | Jensen-Horne et al. |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0079066 A1 | 3/2012 | Li et al. |
| 2012/0083266 A1 | 4/2012 | VanSwol et al. |
| 2012/0110564 A1 | 5/2012 | Ran et al. |
| 2012/0149404 A1 | 6/2012 | Beattie et al. |
| 2012/0173610 A1 | 7/2012 | Bleau et al. |
| 2012/0174095 A1 | 7/2012 | Natchadalingam et al. |
| 2012/0201238 A1 | 8/2012 | Lawson et al. |
| 2012/0208495 A1 | 8/2012 | Lawson et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0156024 A1 | 6/2013 | Burg |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

RFC 3986: Uniform Resource Identifier (URI): Generic Syntax; T. Berners-Lee, R. Fielding, L. Masinter; Jan. 2005; The Internet Society.

* cited by examiner

Mixer Topology Conference 1 910

| Media Source (e.g., Participant, Mixer) | Mixer ID | Mixer Channel ID |
|---|---|---|
| P1 (415-555-3636) | 621a | 2 |
| P2 (310-463-6672) | 621a | 3 |
| P3 (212) 218-9887 | 621b | 2 |
| P4 (415-456-3334) | 621b | 3 |
| P5 (415-456-3335) | 621c | 3 |
| P6 (415-456-3326) | 621c | 4 |
| Output of Mixer 621a | 621b | 1 |
| Output of Mixer 621b | 621c | 2 |

Mixer Topology Output: Output of Mixer 621c

Mixer Topology Conference 2 920

| Media Source (e.g., Participant, Mixer) | Mixer ID | Mixer Channel ID |
|---|---|---|
| P7 (44 020 7766 7300) | 623a | 3 |
| P8 (415-988-9933) | 621d | 2 |
| P9 (415-879-9328) | 621d | 3 |
| P10 (44 020 7766 7304) | 623a | 4 |
| P11 (415-938-3265) | 621d | 4 |
| Output of Mixer 621d | 623a | 2 |

Mixer Topology Output: Output of Mixer 623a

Mixer Topology Conference 3 930

| Media Source (e.g., Participant, Mixer) | Mixer ID | Mixer Channel ID |
|---|---|---|
| P12 (212-908-8495) | 621a | 5 |
| P13 (212-677-3453) | 621a | 6 |
| P14 (212) 218-9887 | 621b | 5 |
| P15 (415-459-2331) | 621b | 6 |
| P16 (415-459-2332) | 622d | 3 |
| P17 (415-459-2323) | 622d | 4 |
| Output of Mixer 621a | 622d | 1 |
| Output of Mixer 621b | 622d | 2 |

Mixer Topology Output: Output of Mixer 622d

FIGURE 9A

SYSTEM AND METHOD FOR MANAGING CONFERENCING IN A DISTRIBUTED COMMUNICATION NETWORK

CROSS-REFERENCE TO RELATED APPLICATIONS

This application claims the benefit of U.S. Provisional Application Ser. No. 62/021,641, filed on 7 Jul. 2014, which is incorporated in its entirety by this reference.

TECHNICAL FIELD

This invention relates generally to the telephony field, and more specifically to a new and useful system and method for managing conferencing in a distributed communication network.

BACKGROUND

In recent years, innovations in web application and Voice over Internet Protocol (VOIP) have brought about considerable changes to the capabilities offered through traditional phone and communication services. In some distributed or cloud-based telephony systems, the routing of audio, video, or other media files can be determined or limited by the location and/or availability of the appropriate computing resources. In the case of conference calls, the size of the conference, the quality of the media communication, and capability to support all regions can be limited and can be resource prohibitive. In some cases, conferencing systems are replicated in different regions. But such solutions do not solve inter-regional communication issues, and further creates division in infrastructure, which can complicate maintenance and further improvement. Thus, there is a need in the telephony field to create a new and useful system and method for managing conferencing in a distributed communication network. This invention provides such a new and useful system and method.

BRIEF DESCRIPTION OF THE FIGURES

FIGS. 9A-D are diagrams that depict exemplary mixer topologies;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. SYSTEM FOR OPERATING SCALABLE CONFERENCING SERVICES

Figure 1:
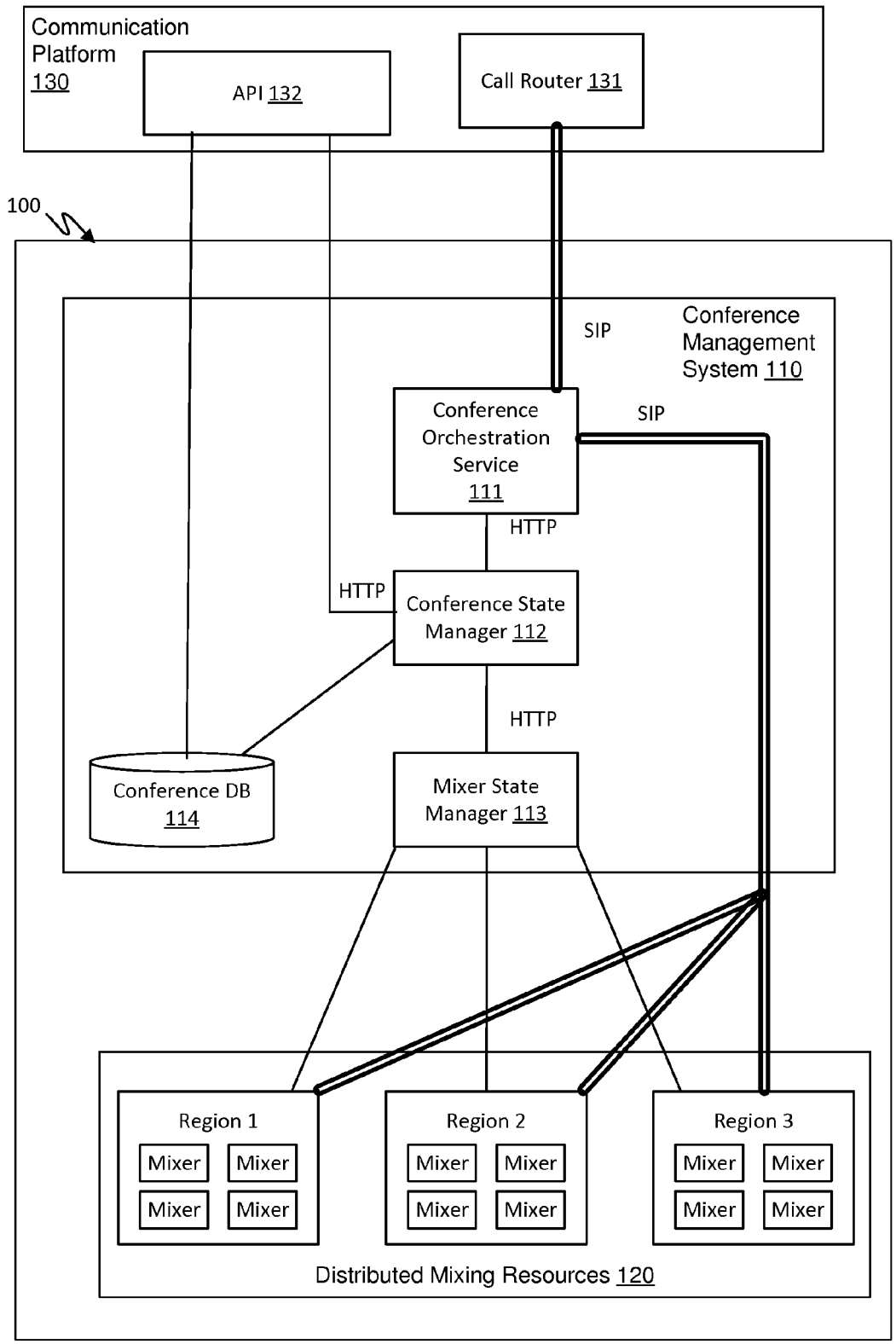
FIG. 1 is schematic representation of a system of a preferred embodiment.

As shown in FIG. 1, a system 100 for operating scalable conferencing services of a preferred embodiment can include a conference management system 110 and a set of distributed mixing resources 120. The conference management system preferably no includes a conferencing orchestration service 111, a conference state manager 112, and a mixer state manager 113. The system 100 functions to provide a high quality conferencing system. The system 100 preferably additionally provides regional accessibility, scalability, and efficiency. The system 100 is preferably architected such that communication quality and performance can be high across a wide range of regional areas. The scalability preferably enables the system 100 to scale out to a large number of participants spanning multiple mixer instances as well as supporting multiple distinct conferences. The system 100 efficiency preferably achieves resource usage that can be substantially proportional to the number of participants.

The system 100 is preferably applied in a communication platform (e.g., the communicating platform 130 of FIG. 1). In one implementation, the system 100 is preferably applied in a communication application platform such as the one described in U.S. Pat. No. 8,306,021 Issued on 6 Nov. 2012, which is hereby incorporated in its entirety by this reference. A communication application platform can execute business logic during a communication session such that a communication state can be directed by application logic and/or API requests. The system 100 is preferably used for synchronous media communication such as voice communication. Voice communication may include communication legs over PSTN, SIP, WebRTC, over the top proprietary IP communications, and/or any suitable communication protocol. Other forms of media such as video may additionally be supplemented or executed using substantially similar systems. For example, audio channels of a video communication session may use the system while individual video media channels are individually routed. In another variation, video may be composited and "mixed" into a single media stream in a manner similar to the audio. Within the communication platform, the communication is preferably divided into media and signaling, and a single communication protocol, such as SIP, may be used for a consistent transport protocol of the signaling within the platform. Other communication protocols may be connected on the edge of the platform or at any suitable location.

In media and signaling protocols, such as SIP, the signaling portion of the communication preferably contributes control directives and a mechanism to communicate various aspects concerning a communication session, and the media portion of the communication is preferably the channel through which media is transferred. The media portion can be particularly susceptible to latency issues caused by the routing path. The signaling route and the media route can diverge in their network topology.

The conference management system 110 preferably functions to control state of the conferencing system 100. As one aspect of the system 100, the system 100 is preferably distributed across multiple regional infrastructure systems. Having a physical system presence in different areas can promote higher quality communications. The management is preferably centralized to a single set of resources, but may alternatively be replicated in other regional instances. As mentioned above, the conference management system 110 preferably includes a conferencing orchestration service 111, a conference state manager 112, and a mixer state manager 113. The communication platform may provide other services that function to establish individual communication sessions, which may be connected in or transitioned to a conferencing state at least partially handled by the system 100. For example a call router (e.g., 131 of FIG. 1) may facilitate handing incoming calls, making outgoing calls, and controlling communication state (e.g., state as directed by a communication application).

The conferencing orchestration service in of the preferred embodiment functions to orchestrate the conferencing service on a signaling level. The conferencing orchestration service in preferably maintains a communication session model of the conference. The conference orchestration service preferably maintains the signaling dialog with communication services (e.g., the call router 131 of FIG. 1) of the communication platform (e.g., 130 of FIG. 1). Requests for a new conference are preferably sent to and established through the conferencing orchestration service 111. The conferencing orchestration service in preferably has a media/signaling protocol communication interface with the call router (e.g., 131) or other suitable communication services of the communication platform (e.g., 130). In one preferred implementation, the conference orchestration service 111 maintains a SIP dialog with a call router (e.g., 131) and through a back-to-back user agent (B2BUA) mechanism, redirects the back leg of a communication to either the call router (e.g., 131) or to a mixer channel (e.g., a mixer channel of the distributed mixing resources 120. Redirecting to a call router (e.g., 131) may be used to put a communication session into a wait-state by playing a wait song or processing any suitable wait-state application. The conferencing orchestration service 111 is preferably fronted by load balancing mechanism such that any new incoming requests (e.g., SIP INVITES) are distributed to a new server using a round-robin policy.

Individual nodes in the conferencing orchestration service 111 can additionally include an API that enables the conference state manager 112 to notify the conference orchestration service in of state changes. For example, notifications such as "conference starting—please dial in" or "conference ending" or "participant joining/leaving" may be sent through the API. The API is preferably an internal REST API but any suitable API may alternatively be used. The conferencing orchestration service 111 preferably delegates management of conference state to the conference state manager 112. The conference state manager 112 can then direct the conferencing orchestration service 111 to negotiate media with assigned mixers (e.g., mixers of the distributed mixing resources 120).

The conference state manager 112 of the preferred embodiment functions to manage the state of the conferences in a highly available manner. The state of conferences is preferably global across multiple communication platform regions. The conference state may reference conference participants and mixers in different regions. The conference state manager 112 preferably maintains an application model of a conference. The conference state 112 manager preferably stores a data object representation of a conference. The data model of a conference may include a list of participants, duration of the conference, and state of the conference (e.g., waiting for participants, in session, completed, and the like). The conference state manager preferably 112 includes an interface to an Application Program Interface (API) (e.g, the API 132) of the communication platform (e.g., 130), which may be an access point for programmatically inspecting and/or modifying the state of a conference. The conference state manager 112 preferably includes application layer communication interfaces to the API (e.g., 132), the conference orchestration service 111, and the mixer state manager 113. The application layer communication interfaces preferably use HTTP/S, but may alternatively use any suitable application layer protocol. The conference state manager 112 can relay changes in state of a conference to the conference orchestration service in, which can make suitable changes to the managed media services. The conference state manager 112 additionally utilizes the mixer state manager 113 to setup and determine mixer setup for a given conference. The conference state manager 112 may be fronted by a load balancer.

The mixer state manager 113 of the preferred embodiment functions to monitor and control the set of mixer resources (e.g., mixer resources of the distributed mixing resources 120). The set of mixers may be distributed across multiple regions (e.g., "Region 1", "Region 2", and "Region 3" of FIG. 1), and each regional set of mixers may have various amounts of mixing capacity and number of running instances. Additionally, each mixer may be in different states depending on whether the mixer is serving a conference, multiple conferences, or idle. The mixer state manager 113 preferably manages a data model of the mixer resources. The mixer state manager 113 may store the mixer state information across a distributed storage system such that access to the information is highly available. As described above, an application layer communication interface preferably exists between the conference state manager 112 and the mixer state manager 113. The mixer state manager 113 additionally include a communication control protocol interface with the set of mixers (e.g., mixers of the distributing mixing resources 120), such as SIP or at least some signaling portion of a media and signaling protocol. The mixer state manager 113 is preferably configured to be responsive to requests of the conference state manager 112. The mixer state manager 113 can provide information about the current state of mixers (e.g., mixers of the distributing mixing resources 120) and additionally allocate mixers. The mixer state manager 113 can assign participants to particular mixers. The mixer state manager 113 can preferably apply regional and quality based heuristics in assigning mixers. Additionally, the mixer state manager 113 can additionally consider the distribution of participants according to the partitions of a mixer instance. A mixer may fail at times, and the mixer state manager 113 can detect the mixer failure for a conference session, allocate a new mixer, and re-invite participants to recover from the failure.

The set of mixers (e.g., mixers of the distributing mixing resources 120) of the preferred embodiment functions to provide a set of resources that can merge, bridge, or otherwise combine media streams to allow multiple legs in a communication. There is preferably a plurality of mixer instances in the set of mixers. The set of mixers may additionally be distributed across distinct regional areas. A subset of mixers can exist in a first region (e.g., "Region 1" of FIG. 1) and a second subset of mixers can exist in a second region (e.g., "Region 2" of FIG. 1). A region preferably describes distinct computer cluster location where a set of resources of the communication platform is instantiated. For example, a first region may exist on the West coast while a second region exists in the East cost. As media may be sensitive to latency from routing between regions, a set of regional subsystems can facilitate improving communication quality and in particular reducing media latency.

Mixers can preferably be used in isolation for a conference—one mixer facilitates completing mixing for every participant in a conference. Alternatively, mixers may be used in combination to facilitate mixing for all participants. Mixers may be used in series. For example, a first mixer may mix three of the eight participants in a conference, a second mixer may mix another three, and a third may mix two remaining participants. The three mixers are preferably set to be bridged for those partitions so that all eight participants are appropriately mixed. The mixers may be arranged in a hierarchical or network formation. For example, two mixers may mix media streams of participants, and the output media stream from each of these two child mixers can be mixed by a parent mixer. Such mixing architecture can be used to flexibly use the capacity of the mixing resources.

The system (e.g., 100) of the preferred embodiment is preferably operable in at least two regions, which are connectable through the media resources of the system. Various provider services in the regions can facilitate connecting media streams to outside endpoints (e.g., PSTN phones, SIP phones, or IP communication devices). The regions are preferably selected to serve endpoints local to that region. The regions may be separated by globally significant distance. A globally significant distance in this document may be understood to be a transmission distance greater than 2000 miles and more preferably greater than 5000 miles. For example, the first region may be on the West coast of the US and the second region may be on the East coast, separated by a geographic distance greater than 2500 miles. In another example, the first region may be in the United States and the second region may be in Europe, separated by a distance greater than 3500 miles. The first region and the second region are not limited to functioning with such distance ranges and may be separated by a distance less than 2000 miles or exceeding 5000 miles.

A mixer (e.g., a mixer of mixing resources 120) of a preferred embodiment functions to mix or combine at least two sources of synchronous communication. In particular, audio media streams are combined into a single audio stream. A mixer is preferably a service that includes a communication interface and processing capabilities. In one preferred implementation, the communication interface is an SIP interface, which may be used in interfacing with the communication orchestration service in, other mixers in the same region, mixers in other regions, and/or other communication resources such as recording services, and communication gateways (which may connect to destination endpoints).

The mixer may have a participant input capacity, which limits the number of participants that can be mixed. The mixer preferably includes a number of participant input channels. For example, a mixer may be able to handle up to 500 participants. The number of participant input channels can additionally be distributed across distinct conference sessions, such that one mixer instance can serve multiple conferences. A mixer preferably outputs mixed media, which may be directed to endpoint connections and/or other mixers. A mixer preferably has an identifier such that media can be directed to specific mixers as assigned by the mixer state manager 113. Various other capabilities may be built into a mixer. The mixers may additionally include media mixing capability that allows a manager to listen to a participant leg (i.e., the manager is a silent participant). Additionally, the mixer may include mixing capability to segment portions of audio to subset of participants. For example, one participant may be able to privately converse with one other participant without other participants hearing their conversation.

The system (e.g., 100) can include resources or functionality modules that can provide recording, transcription, text-to-speech services, DTMF input, speaker identification service (e.g., which participant is speaking when), or any suitable media service.

2. METHOD FOR OPERATING SCALABLE CONFERENCING SERVICES

Figure 2:
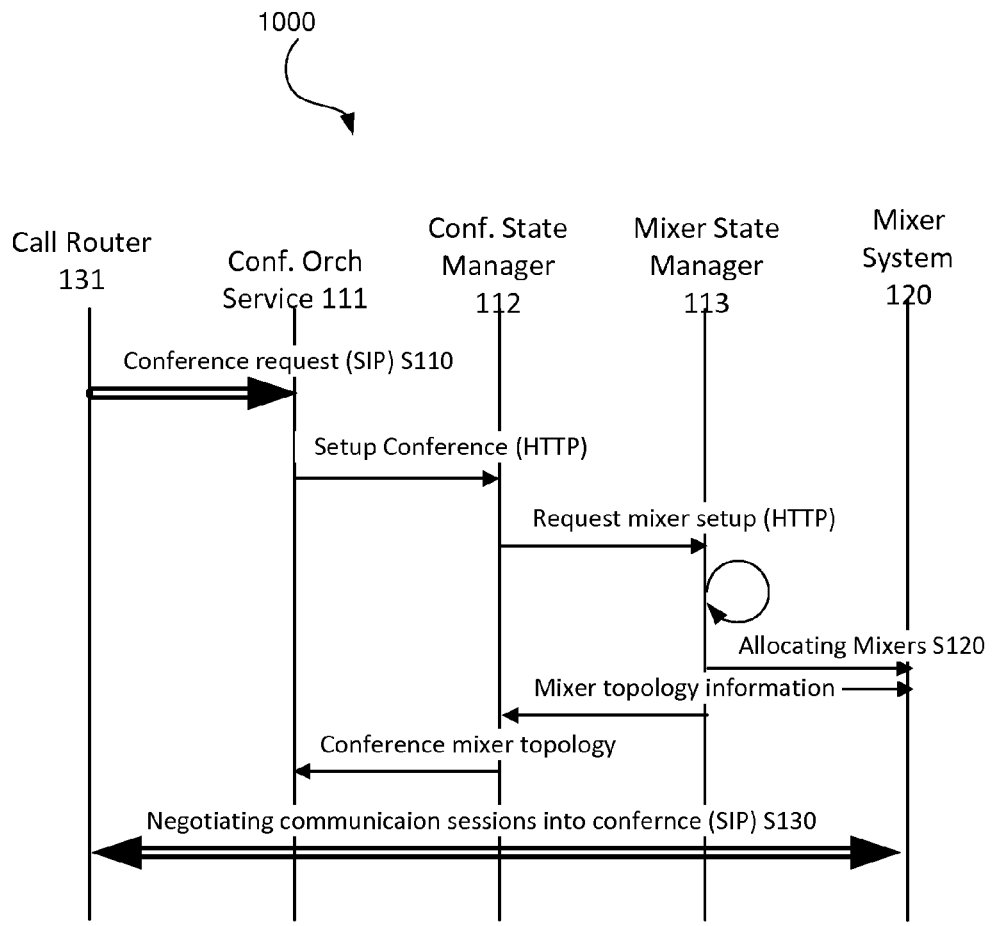
FIG. 2 is a communication sequence diagram of a method of a preferred embodiment.

As shown in FIG. 2, a method for operating scalable conferencing services of a preferred embodiment can include receiving a request for a new conference S110, allocating mixers of the conference S120, and negotiating media across the allocated mixers S130. More specifically, a mixer topology is created according to regional associations and restrictions. Then when negotiating media across the allocated mixers, participants are allocated to input channels of a mixer and mixers are bridged to form a determined mixer topology.

The method functions to provide a high quality conferencing service. The method may additionally promote regional accessibility, scalability, and efficiency. The scalability preferably enables the method to facilitate conferences with a large number of participants, spanning multiple mixer instances, as well as supporting multiple distinct conferences. The system efficiency preferably achieves resource usage that can be substantially proportional to the number of participants. The method is preferably implemented by the system (e.g., 100) described above, but may alternatively be implemented by any suitable system.

The method may be applied in a variety of conferencing scenarios. The method preferably accounts for different scaling and allocation scenarios so as to provide high capacity and high quality conferencing. The method can be used in conferencing scenarios such as when the participants are geographically distributed, where the conference is not started until all participants join, where a conference can organically grow without a priori knowledge of the identity or number of participants, and other suitable scenarios.

Block S110, which includes receiving a request for a new conference, functions to receive some directive to create a conference. The request can be part of an asynchronous API request. The request may alternatively be a response to the routing of communication. For example, a communication session may hit a conference orchestration service (e.g., in of FIG. 1) and be placed in a conference. While an endpoint and corresponding communication session is waiting to join a conference session, the communication session may be directed to a wait-state application which can play music, execute an application, or perform any suitable application logic. The communication session is preferably transferred into an active communication session during block S130.

Block S110, preferably includes determining participants of the conference. Participants may be present on an existing or otherwise established communication session. For example, a caller may be transferred into a conference. As another example, a caller may dial in to a phone number or other suitable endpoint, which is mapped to a particular conference. A conference state manager (e.g., 112 of FIG. 1) preferably manages the conference participants. In one case, participants may be specified through an API (e.g., the API 132 of FIG. 1). The API calls are preferably directed to the conference state manager (e.g., 112) such that state can be updated. In some cases, a participant may not be present in an active communication session. The method can include making an outgoing communication request to establish a communication session with the missing participant such that the participant can be added to a conference. In some cases, the conference waits for some initiating condition such as a conference start time, threshold number of participants, or any suitable condition. In other cases, a conference session can begin as soon as the conference is created.

In addition to determining participants, the method preferably includes determining participant regions. The conferencing infrastructure may be distributed across various regions. Geographic proximity to a region may improve communication quality. The regions associated with a participant may be completed through processing an endpoint. In some cases, endpoints (such as telephone numbers) will include location-overloaded information (e.g., country/area codes). Alternatively, location information may be collected and obtained through any suitable method or source.

Block S120, which includes allocating mixers (e.g., mixers of the distributed mixing resources 120 of FIG. 1) of the conference, functions to setup mixers to handle the conferences session. Allocating mixers preferably includes determining which mixers, and specifically which participant will be assigned to which input channel of a mixer. Additionally, a multi-mixer topology can be created which defines bridging of media between mixers. The mixer state manager 113 preferably stores state of the set of mixers. Mixers may be in different states of usage. In some cases allocating mixers may involve adding mixers in one or more regions. Mixers can additionally be removed from the set of mixers. As another variation, allocating mixers can involve transitioning an existing conference in response to the mixing requirements introduced. Such responsive changes to conference mixing function to improve overall communication quality across multiple conferences.

Allocating mixers (block S120) preferably includes processing the information related to the conference and generating a mixer topology. Generating a mixer topology preferably calculates an arrangement/architecture to mixer assignment and bridging so as to obtain high quality communication. The mixer topology preferably characterizes and identifies how the media from participants is mixed to form a conferencing experience. With the mixer resources described above, a participant is preferably mapped to one particular media input channel. The mixer topology can be generated according to some operational goal. Preferably the goal is communication quality. High quality communication is preferably a function of communication latency, which is preferably minimized or reduced. Other properties that may additionally or alternatively be factored into the evaluation function of communication quality can include packet loss, post dial delay (PDD) (i.e., time for carrier to indicate the other side is ringing), monetary cost to the platform provider, monetary price charged to account holder, media quality, and/or any suitable factor. Generating a mixer topology can additionally account for mixer capacity. Additionally, how multiple mixers can be bridged may additionally be determined.

The mixer topology can consider various factors and may include heuristics for particular scenarios. In one variation, block S120 can include grouping participants into mixer input channels according to regional association. More specifically, the orchestration of mixers may be such that the conference achieves local media communication quality. In other words, participants local to other participants experience improved communication quality. For example, if a conference exists by a group of 3 participants in the West coast and 4 in the East coast, then a set of mixers in a Western region handle the first set of participants and a set of mixers in the Eastern region handle locally conferencing the second set of participants. Communication quality may be of lower quality between the participants in the two regions, but conferencing between the local participants may have high quality communication.

In another variation, block S120 can include grouping participants into mixer partitions by participant priority. Participants may be marked by different priority. The priority may be based on who organized the meeting, the role in the conference, or any suitable property. For example, a massive conference may have a host/moderator, a panel (who will contribute to the discussion), and then audience members who may be silent participants but may be allowed to ask questions at times. Mixing topology generation can weigh the priority of participants when calculating conference quality. For example, participants that will primarily be listening may not have a high demand for low latency communication, and so the mixer topology may not optimize for minimizing media latency for these participants.

Block S130, which includes negotiating routing media of the set of communication sessions to the allocated mixers, functions to route media of participants to assigned mixers and start the conferencing session. Negotiation routing media preferably includes various signaling handshaking between involved media resources and the mixer resources. The media is preferably routed according to the mixer topology which can include routing media of participants to assigned mixer input channel and bridging mixed media across mixer instances. As described above, SIP or an alternative media and signaling protocol may be used in directing participant communication sessions from a conference orchestration service 111 to mixers. In particular, the media of the participant communication session is routed to a mixer. Intermediary nodes may be used in the routing to mixer. For example, regional gateway proxy servers may be used when routing media or signaling to outside regions. Within a mixer, the set of participant input channels for a conference are mixed or combined through any suitable processing. The output of the mixing can be bridged to another mixer for further mixing or redirected to a connected endpoint.

Negotiating the routing of media preferably establishes various mixer scenarios. In a first variation, the participants may be serviced by a single mixer. A single mixer may be used when all participants have relatively close proximity to the mixer, and a mixer has capacity to handle the number of participants.

Figure 3:
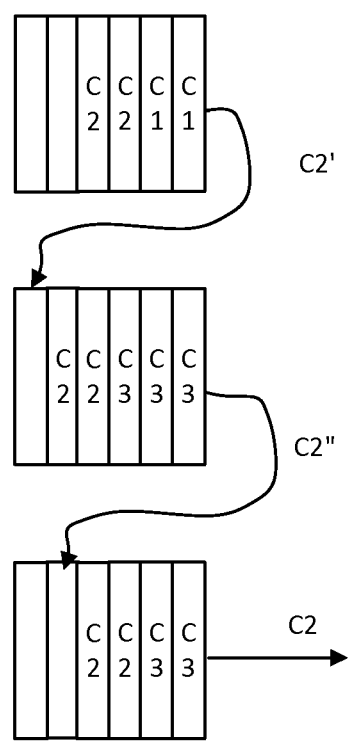
FIG. 3 is a schematic representation of a variation distributing participants across a series of mixers.
Figure 4:
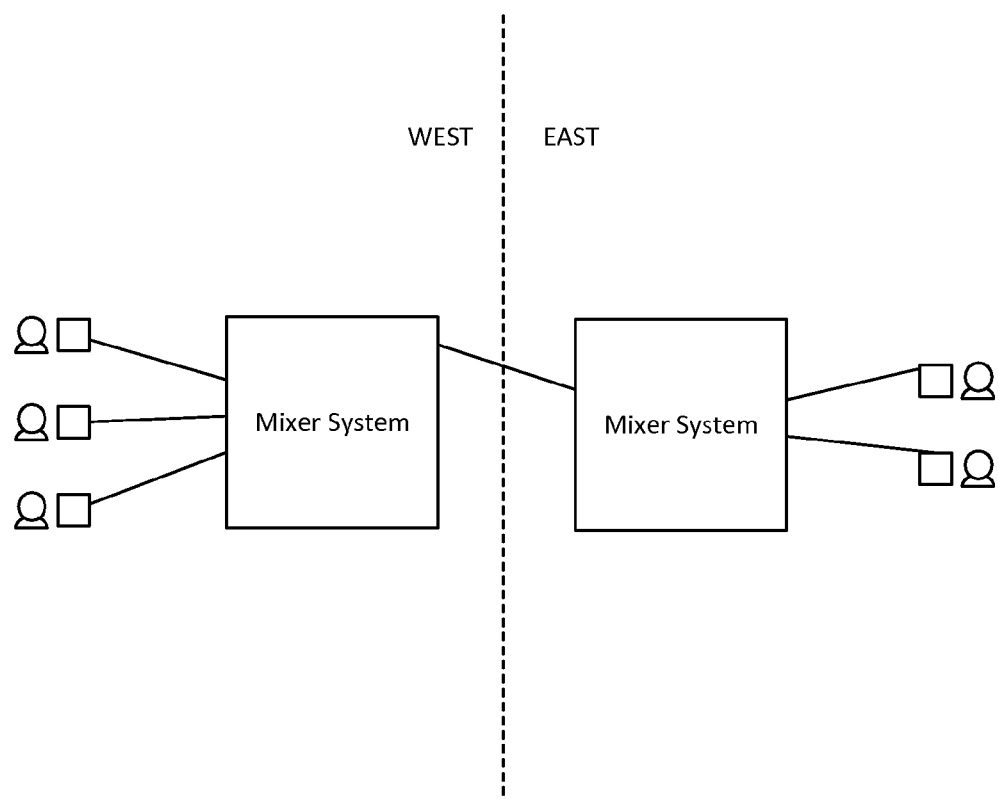
FIG. 4 is a schematic representation of a variation of regionally mixing media.

In other instances, multiple mixers may be used. In one use-case, a single mixer may not have capacity for a conference, and so the participants are distributed across multiple mixers as shown in FIG. 3. In another use-case, multiple mixers may be used so as to give a subset of participants regional mixing within the conference as shown in FIG. 4. The mixers preferably bridge over to other mixers such that a mixer output channel is mixed as an input to a second mixer.

Figure 5:
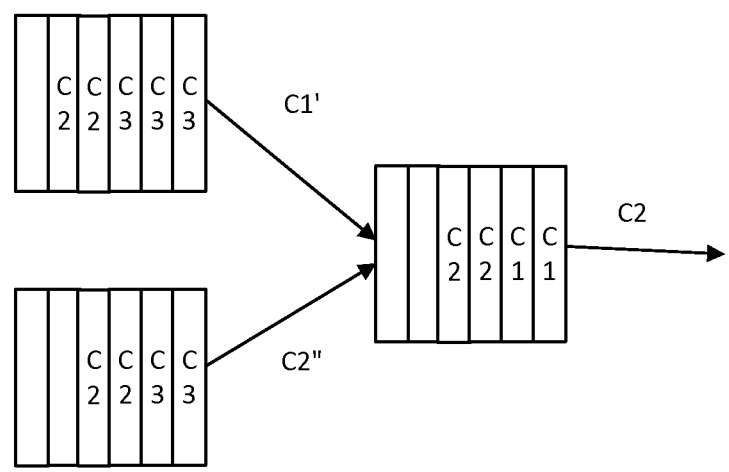
FIG. 5 is a schematic representation of a variation mixing participants through a hierarchical mixer configuration.

In yet another instance, mixers may be used in a hierarchical mixing. In hierarchical mixing a mixer mixes output channels of at least two mixers as shown in FIG. 5. Participant input channels can additionally be mixed simultaneously with hierarchical mixing.

Once negotiated, a conference session can take place, and participants can communicate as a group. Various features may additionally be supported during a conference.

A conference is preferably exposed as an accessible API resource, and as such, the conference can preferably be manipulated through various directives. The state of the conference can be queried. Information such as conference status (e.g., waiting, started, ended), participant count, participant identification, conference duration, an event log of the conference (e.g., when people joined/left, who spoken when, etc.), and other suitable pieces of information can be supplied in an API response. Additionally the conference may be augmented. API calls directed at a particular conference may add or remove participants, mute participants, set up individually directed media control, split a conference into multiple conferences, join a conference with another conference, end the conference, and/or make any suitable change.

A method can additionally include individually directing the media flow of one or more participants. With individual media control in addition to the group mixing, participants may be able to listen in on a second participant. As an exemplary use case, a manager may want the capability to listen in on a participant's leg of the conference. As another variation, a participant may want the capability to transfer media to only a subset of participants. For example, during a conference, a first participant may want to say something to a second participant without the other participants hearing what is said. As another example, the first participant may want to say something to a larger subset of participants (e.g., two or more people) without the rest hearing.

Event callbacks can additionally be configured for the conference. An event callback is preferably a mapping between an event and a designated callback destination such as an URI or other resource that is accessed when the event is detected. A callback destination may also be a pre-established application session using web-sockets or some other similar mechanism. In particular, a speaker callback, may be triggered when a speaker changes in the conference. For example, an application that setup the conference may set a speaker callback URI. When a speaker changes in the conference, an HTTP messages is sent to the speaker callback URI. The message preferably identifies the new speaker and optionally the time of the change and the last speaker. Another callback may be for communication input. In telephony conferences, participants may be able to provide input through DTMF input. An input callback will preferably hit the input callback resource with information about input (e.g., who entered what key when). Other callbacks can include when the conference starts, when the conference ends, when there is a change in the participants (e.g., a new one joins or leaves), or any suitable event.

The method can additionally include transitioning mixer topology, which functions to adapt negotiated mixer topology according to new conditions. Participants can join and leave during a conference, and as such the preferred mixer topology can change. The transition can be in response to any number of triggers. In one variation, the mixer topology may be re-evaluated and possibly transitioned each time there is a change in participants. This may provide high quality communication throughout a conference. In another variation, the conference may be re-evaluated periodically, which may avoid overhead of frequent transitions but allow communication to be eventually transitioned to a preferred state. In another variation, the transitioning may be re-evaluated and initiated in response to a trigger. For example, a user input may signal that the communication quality is lacking, and should be refreshed to improve quality. Other variations may include variations more directed at changes in regional mixing, or the number of participant changes, total number of participants, and other factors.

The method described above was directed towards a single conference instance, but the system and method is preferably used in situations where multiple conferences are facilitated simultaneously. More preferably, the method is used to service the conferencing features of a multi-tenant communication platform. The selection of mixers additionally considers the usage of mixers across multiple mixers.

3. CONFERENCE SYSTEM

Figure 6:
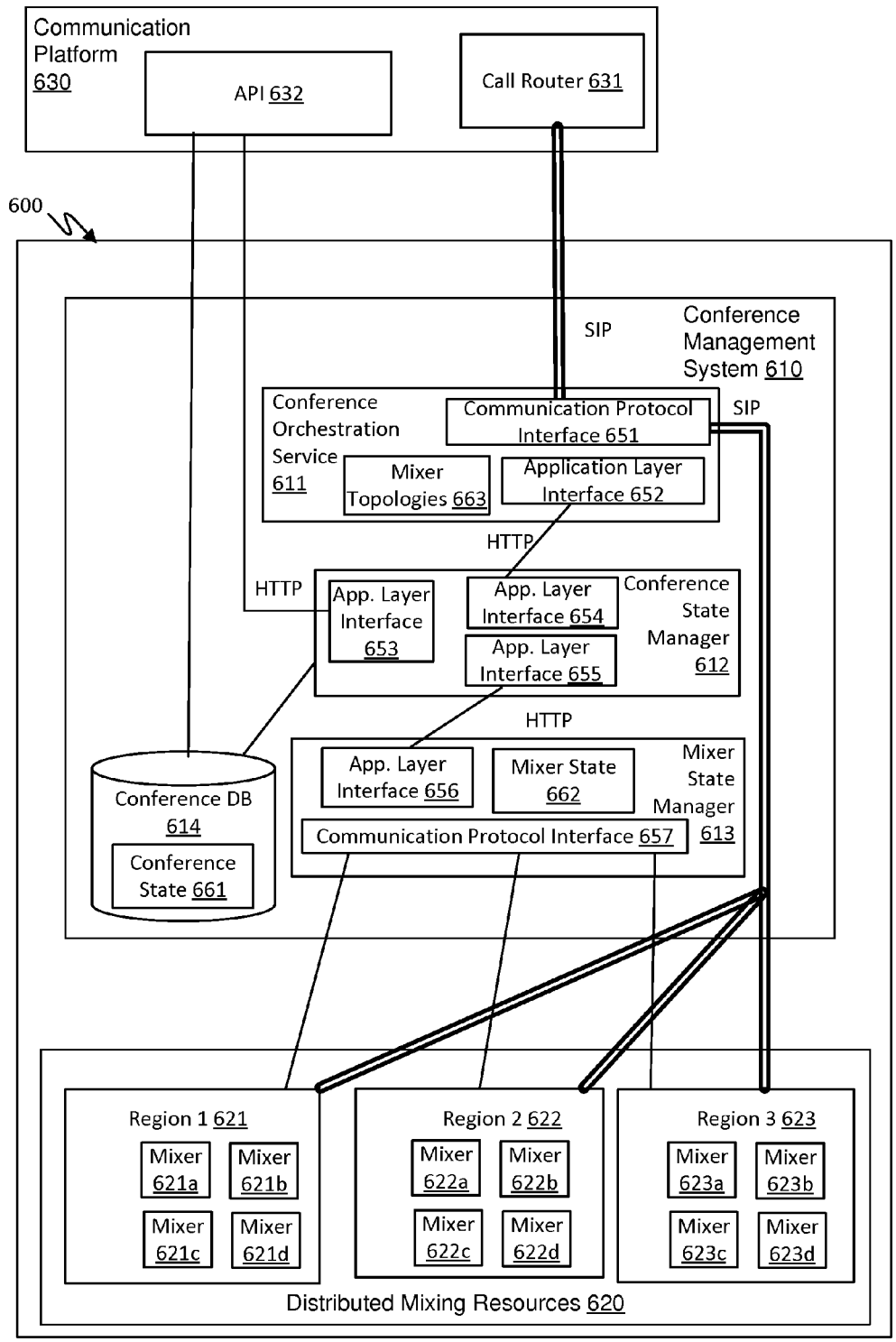
FIG. 6 is schematic representation of a system of a preferred embodiment.

As shown in FIG. 6, a conference system 600, in accordance with an embodiment, includes a conference management system 610 and distributed mixing resources 620. In some implementations, the conference management system 610 includes a conference orchestration service 611, a conference state manager 612, a mixer state manager 613, and a conference database 614.

In some implementations, the conference management system 610 is similar to the conference management system 110 of FIG. 1. In some implementations, the distributed mixing resources 620 is similar to the distributed mixing resources 120 of FIG. 1. In some implementations, the conference orchestration service 611 is similar to the conference orchestration service in of FIG. 1. In some implementations, the conference state manager 612 is similar to the conference state manager 112 of FIG. 1. In some implementations, the mixer state manager 613 is similar to the mixer state manager 113 of FIG. 1. In some implementations, the conference database 614 is similar to the conference database 114 of FIG. 1.

In some implementations each mixer (e.g., 621a-d, 622a-d, 623a-d) is a mixer system. In some implementations each mixer system is a server device (e.g., a server device similar to the server device of FIG. 13). In some implementations the mixers (e.g., 621a-d, 622a-d, 623a-d) are included in a server device. In some implementations the mixers are included in a plurality of server devices. In some implementations, each mixer (e.g., 621a-d, 622a-d, 623a-d) includes at least one processing unit (e.g., a processing unit similar to the processing units described below for FIG. 13, such as, for example, the processing unit 1399). In some implementations, mixers in a same region are included in a same server device. For example, the mixers 621a-d are included in a first server device located in Region 1 (e.g., California, USA), the mixers 622a-d are included in a second server device located in Region 2 (e.g., Virginia, USA), and the mixers 623a-d are included in a third server device located in Region 3 (e.g., London, England). In some implementations, mixers in a same region are included in a same computing cluster (e.g., a computing cluster that includes a plurality of computing devices, such as, for example, a server device similar to the server device of FIG. 13). For example, the mixers 621a-d are included in a first computing cluster located in Region 1 (e.g., California, USA), the mixers 622a-d are included in a second computing cluster located in Region 2 (e.g., Virginia, USA), and the mixers 623a-d are included in a third computing cluster located in Region 3 (e.g., London, England). In some implementations, each server device includes at least one processing unit (e.g., a processing unit similar to the processing units described below for FIG. 13, such as, for example, the processing unit 1399).

Figure 12:
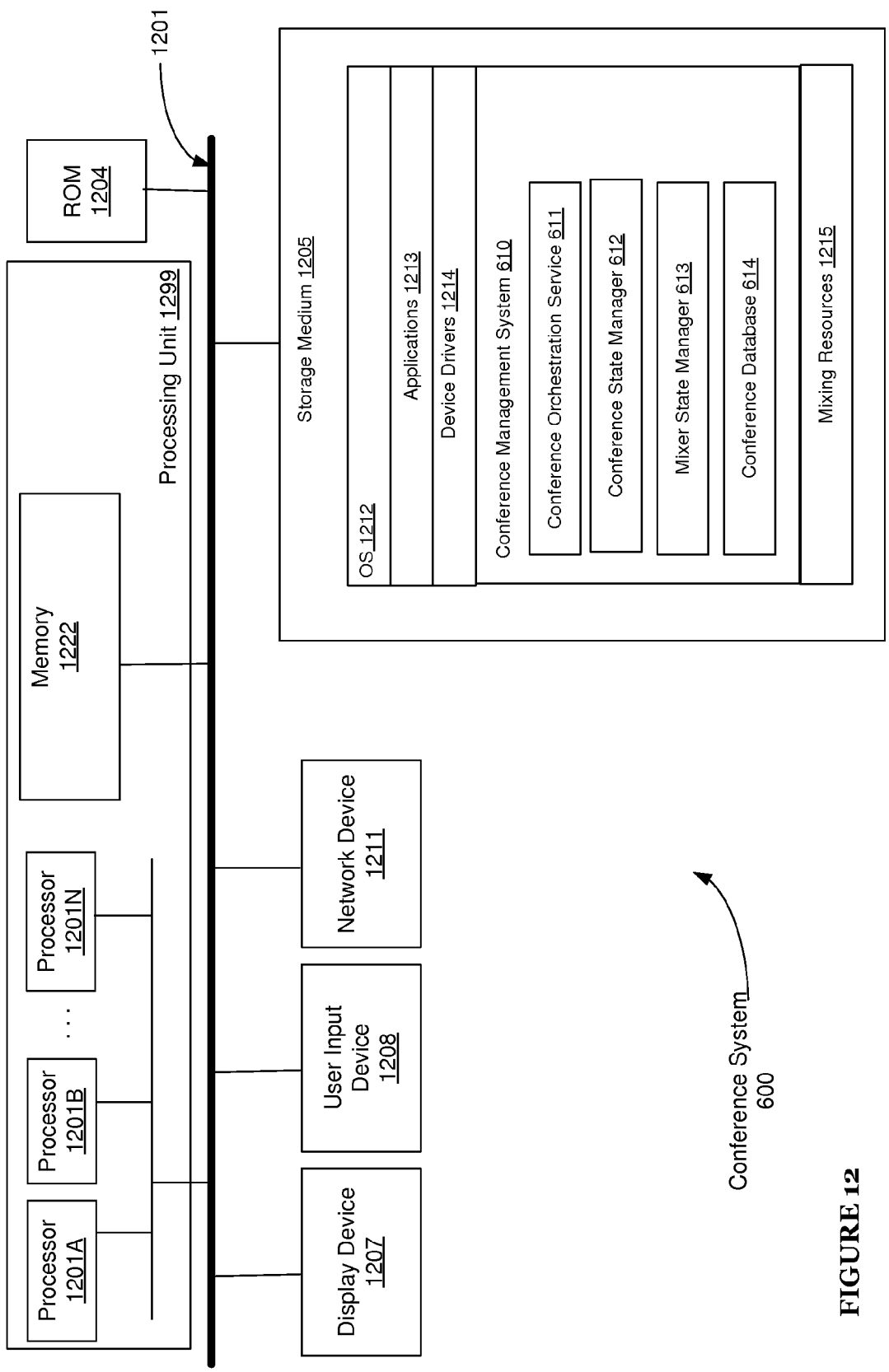
FIG. 12 is an architecture diagram of conference system of a preferred embodiment.

In some implementations, the conference management system 610 is included in a server device (e.g., the server device of FIG. 12). In some implementations, the conference management system 610 is included in a server device (e.g., the server device of FIG. 12), and the conference management system 610 includes at least one mixer (e.g., at least one of the mixers 621a-d, 622a-d, 623a-d). In some implementations, the conference management system 610 is included in a server device (e.g., the server device of FIG. 12), and the conference management system 610 includes mixers of at least one region (e.g., mixers of at least one of "Region 1", "Region 2", and "Region 3") of FIG. 6.

In some implementations, the conference management system 610 is a distributed system that includes a plurality of server devices. In some implementations, the conference management system 610 includes at least one mixer (e.g., at least one of the mixers 621a-d, 622a-d, 623a-d). In some implementations, the conference management system 610 includes mixers of at least one region (e.g., mixers of at least one of "Region 1", "Region 2", and "Region 3") of FIG. 6.

In some implementations, each of the regions of the distributed mixing resources 620 (e.g., "Region 1", "Region 2", and "Region 3") are communicatively coupled via media resources of the system 600. In some implementations, various provider services in the regions facilitate coupling media streams to outside endpoints (e.g., PSTN phones, SIP phones, or IP communication devices). In some implementations, the regions are selected to serve endpoints local to that region. In some implementations, the regions are separated by a globally significant distance. In some implementations, a globally significant distance is a transmission distance greater than 2000 miles. In some implementations, a globally significant distance is a transmission distance greater than 5000 miles. In some implementations, for example, a first region may be on the West coast of the US (e.g., California, USA) and a second region may be on the East coast (e.g., Virginia, USA), separated by a geographic distance greater than 2500 miles. In some implementations, for example, a first region may be in the United States (e.g., Virginia, USA) and a second region may be in Europe (e.g., London, England), separated by a distance greater than 3500 miles. In some implementations, the first region and the second region are not limited to functioning with such distance ranges and may be separated by a distance less than 2000 miles or exceeding 5000 miles.

In some implementations, the conference orchestration service 611, the conference state manager 612, the mixer state manager 613, and the conference database 614 are included in a single server device (e.g., the server device of FIG. 12). In some implementations, the conference orchestration service 611, the conference state manager 612, the mixer state manager 613, and the conference database 614 are included in a distributed computing system that includes a plurality of server devices, and each server device of the distributed computing system includes one or more of the conference orchestration service 611, the conference state manager 612, the mixer state manager 613, and the conference database 614.

In the embodiment of FIG. 6, the conference system 600 is communicatively coupled to a communication platform 630. In some implementations, the communication platform 630 is similar to the communication platform 130 of FIG. 1. In some implementations, the communication platform 630 includes an API 632 and a call router 631. In some implementations, the API 632 is similar to the API 132 of FIG. 1. In some implementations, the call router 631 is similar to the call router 131 of FIG. 1.

As shown in FIG. 6, the conference orchestration service 611 is communicatively coupled to the call router 631 via a communication protocol interface 651, and the conference state manager 612 is communicatively coupled to the API 632 via an application layer interface 653. As shown in FIG. 6, the conference database 614 is communicatively coupled with the API 632.

As shown in FIG. 6, the communication protocol interface 651 communicatively couples the conference orchestration service 611 to at least one mixer of the distributed mixing resources 620.

As shown in FIG. 6, an application layer interface 652 communicatively couples the conference orchestration service 611 to an application layer interface 654 of the conference state manager 612.

As shown in FIG. 6, the conference state manager 612 is communicatively coupled to the conference database 614.

As shown in FIG. 6, an application layer interface 655 communicatively couples the conference state manager 612 to an application layer interface 656 of the mixer state manager 613.

As shown in FIG. 6, a communication protocol interface 657 communicatively couples the mixer state manager 613 to at least one mixer of the distributed mixing resources 620.

In some implementations, the communication protocol of at least one of the interfaces 651 and 657 is SIP (Session Initiation Protocol). In some implementations, the application layer interface of at least one of the interfaces 652, 653, 654, 655, and 656 is an HTTP interface.

In some implementations, the conference database 614 includes conference state 661. In some implementations, the conference state manager includes the conference state (e.g., 661). In some implementations, the conference state 661 includes conference state for each conference of the system 600. In some implementations, the conference state for a conference is generated during reception of a request for a new conference. In some implementations, conference state for a conference indicates at least each participant of the conference. In some implementations, conference state for a conference indicates at least an endpoint identifier (e.g., a telephone number) for each participant of the conference.

Figure 7:
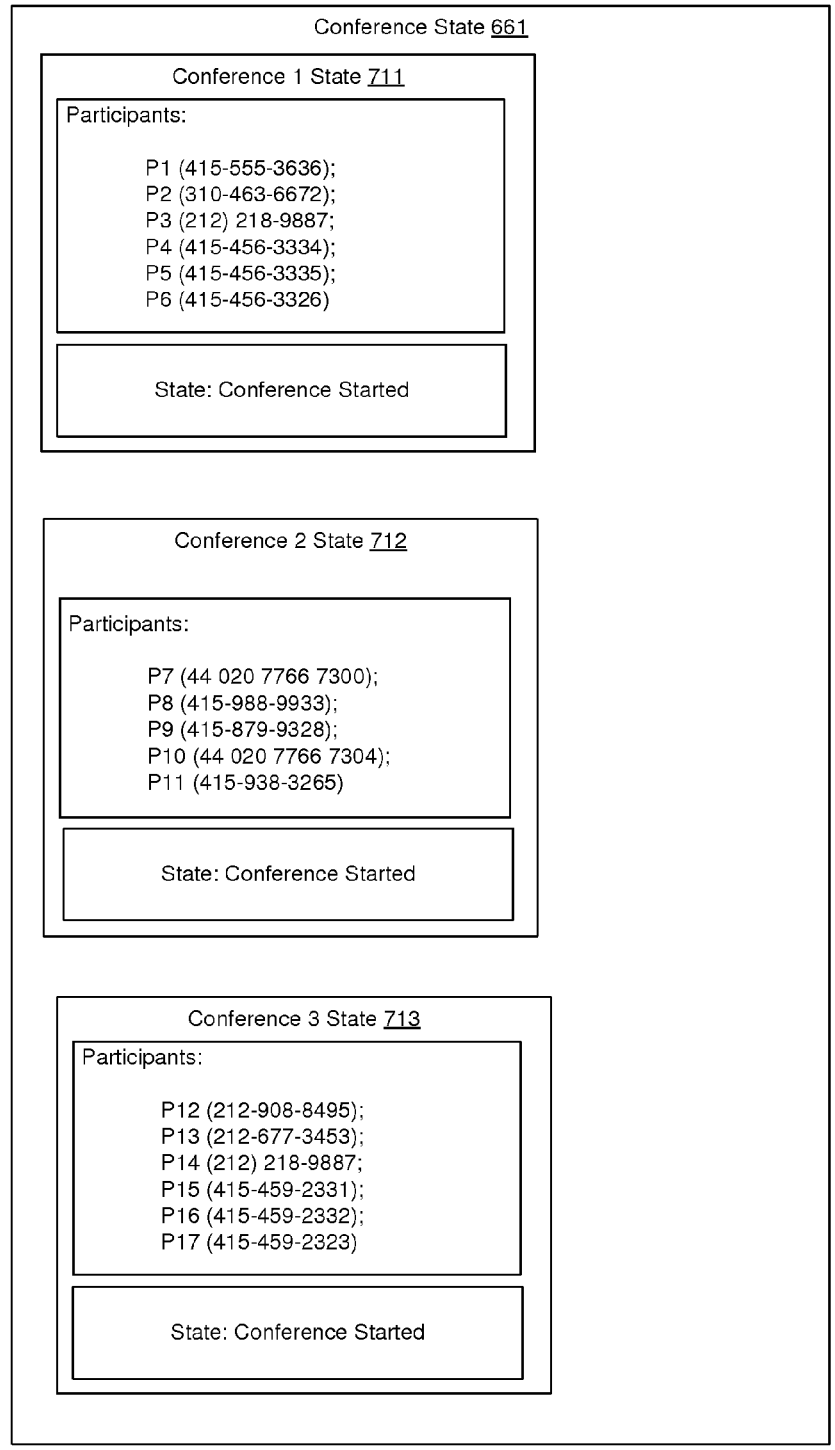
FIG. 7 is a diagram that depicts exemplary conference state.

FIG. 7 depicts exemplary conference state of the conference state 661.

In some implementations, the mixer state manager 613 includes mixer state 662. In some implementations, the mixer state 661 includes mixer state for each mixer of the distributed mixer resources 620 (e.g., the mixers 621a-d, 622a-d, 623a-d) of the system 600. In some implementations, the mixer state for a conference is managed by the mixer state manager 613 during operation of each mixer of the distributed mixer resources 620. In some implementations, mixer state for a mixer indicates at least a status of each channel of the mixer. In some implementations, the status indicates whether the respective channel is in use or not in use. In some implementations, the status indicates that the channel is not in use in a case where the channel is not in use, and indicates at least one of participant identifier and a conference identifier in a case where the channel is assigned to a participant of a conference. In some implementations, a participant identifier is an endpoint identifier (e.g., a telephone number).

Figure 8:
FIG. 8 is a diagram that depicts exemplary mixer state.

FIG. 8 depicts exemplary mixer state of the mixer state 662.

In some implementations, the conference orchestration service 611 includes mixer topologies 663. In some implementations, the mixer topologies 663 includes a mixer topology for each conference for which at least one mixer is allocated. In some implementations, each mixer topology specifies an assignment of each participant of a respective conference to at least one input channel of a mixer. In some implementations, each assignment of a mixer topology indicates an endpoint identifier (e.g., a telephone number) and a corresponding mixer channel identifier (e.g., a mixer ID and a corresponding mixer channel ID). In some implementations, a mixer topology for a conference identifies a mixer output to be provided to the conference orchestration service 611. For example, in a case of a mixer topology that includes more than one mixer, the mixer topology indicates the mixer whose output is provided to the conference orchestration service as the output of the mixer topology.

Figure 9B:
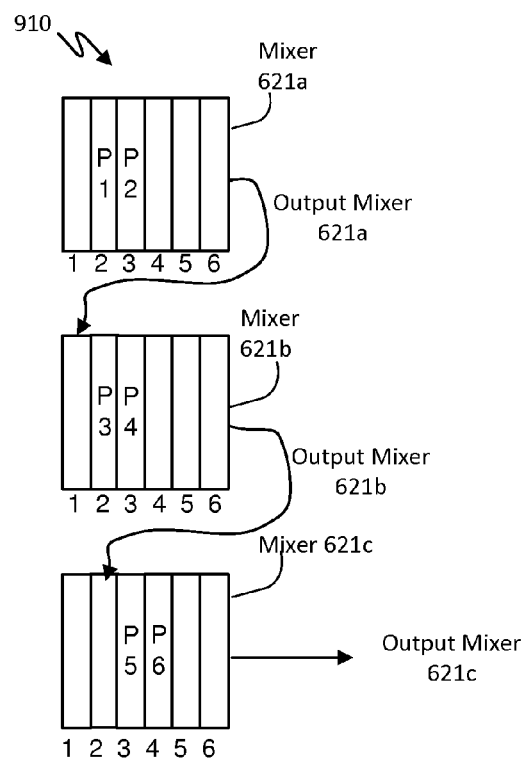
Figure 9C:
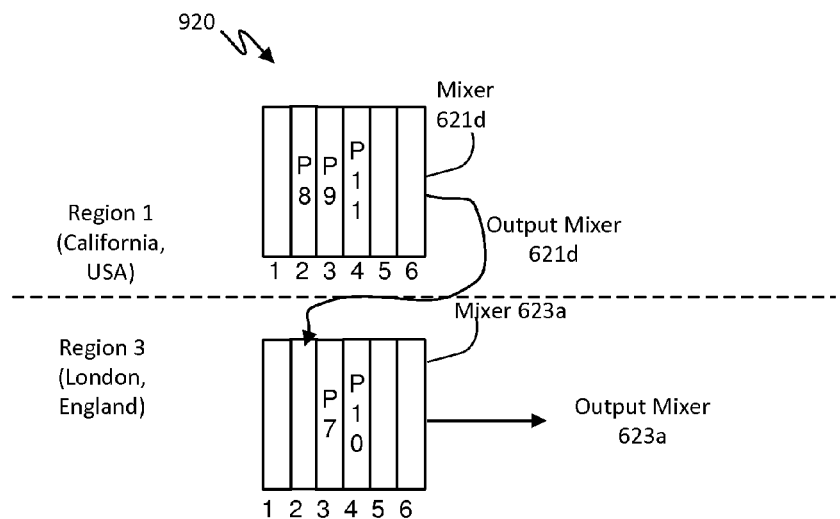
Figure 9D:
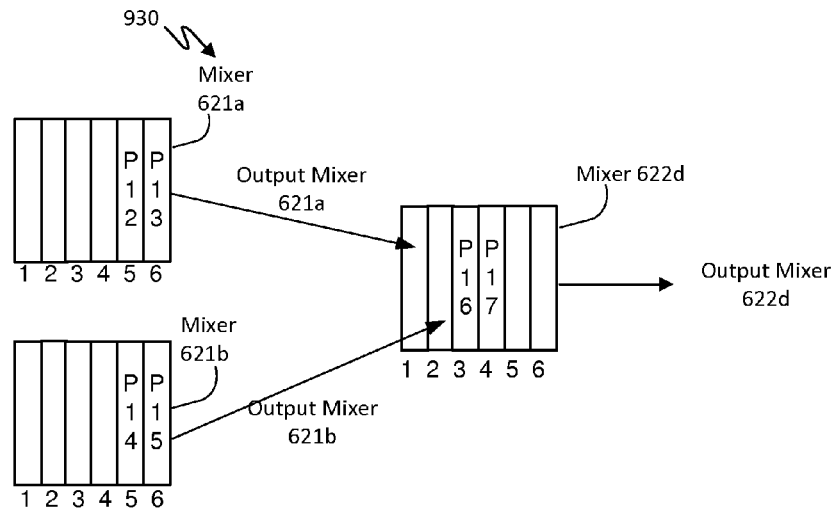

FIGS. 9A-D depict exemplary mixer topologies of the mixer topologies 663. FIG. 9A depicts exemplary data representations of mixer topologies of Conference 1, Conference 2, and Conference 3 of the exemplary conference state information 661 of FIG. 7. FIG. 9B is a diagram representing the mixer topology of Conference 1 state 711. FIG. 9C is a diagram representing the mixer topology of Conference 2 state 712. FIG. 9D is a diagram representing the mixer topology of Conference 3 state 713.

The exemplary mixer state 662 of FIG. 8 represents the mixer state of the mixers (e.g., of the distributed mixing resources 620) after allocation of mixer channels in accordance with the mixer topologies of FIGS. 9A-D.

In some implementations, the conference state manager 612 is constructed to maintain conference state (e.g., conference state 661) of each conference, and to notify the conference orchestration service 611 of conference state changes via the application layer communication interfaces 654 and 652.

4. METHOD OF FIG. 10

Figure 10:
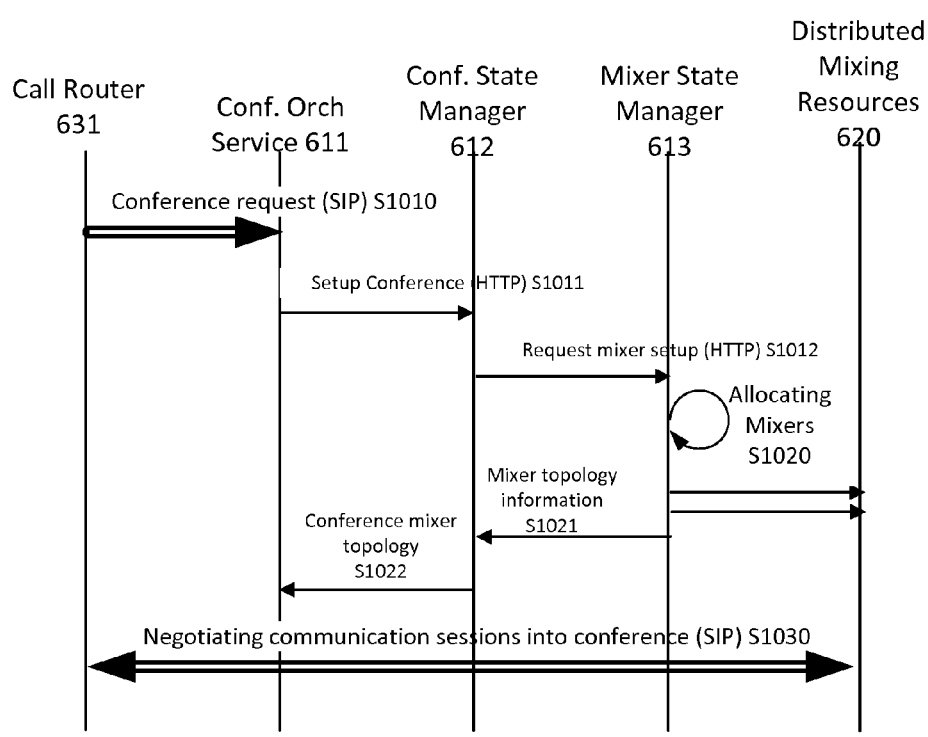
FIG. 10 is a communication sequence diagram of a method of a preferred embodiment.

The method 1000 of FIG. 10 includes, at a conferencing system (e.g., 600 of FIG. 6) constructed to operate scalable conferencing services, the conferencing system including a conference orchestration service (e.g., 611), a conference state manager (e.g., 612), a mixer state manager (e.g., 613), and a set of distributed mixers (e.g., 620): receiving a request for a new conference via at least one of an application layer interface (e.g., 653) of the conferencing system and a signaling protocol communication interface (e.g., 651) of the conference orchestration service (e.g., 611) (process S1010); allocating mixers (e.g., mixers 621a-d, 622a-d, 623a-d of FIG. 6) of the conference, the mixers being mixers of the set of distributed mixers (e.g., 6200) (process S1010), and negotiating media across the allocated mixers (process S1030). Receiving a request for a new conference includes determining participants of the conference. Allocating mixers of the conference includes generating a mixer topology that specifies an assignment of each determined participant to at least one input channel of at least one mixer of the set of distributed mixers. Negotiating media across the allocated mixers includes routing media of each determined participant to the assigned at least one input channel, and starting the conference. The media is routed according to the generated mixer topology. The mixer state manager (e.g., 613) generates the topology responsive to an application layer request provided by the conference state manager (e.g., 612), the conference state manager provides the application layer request responsive to an application layer request provided by the conference orchestration service (e.g., 611), the routing is performed by the conference orchestration service in accordance with a signaling protocol, and the conference orchestration service receives the generated mixer topology from the mixer state manager via the conference state manager.

In some implementations, the generated mixer topology is stored by the mixer state manager. In some implementations, the generated mixer topology is stored at the mixer state manager. In some implementations, the generated mixer topology is stored at a storage medium (e.g., 1205 of FIG. 12) of the system 600.

In some implementations, the system 600 performs the processes S1010-S1030. In some implementations, the conference orchestration service 611 (of FIG. 6) performs the process S1010. In some implementations, the mixer state manager 613 (of FIG. 6) performs the process S1020. In some implementations, the conference orchestration service 611 (of FIG. 6) performs the process S1030.

In some implementations, the process S1010 is similar to the process S1010 of FIG. 2. In some implementations, the process S1020 is similar to the process S120 of FIG. 2. In some implementations, the process S1030 is similar to the process S130 of FIG. 2.

4.1 Receiving a Request for a New Conference

In some implementations, the process S1010 functions to control the system 600 to receive a request for a new conference via at least one of an application layer interface (e.g., 653) of the conferencing system and a signaling protocol communication interface (e.g., 651) of the conference orchestration service (e.g., 611). In some implementations, the communication interface 651 of the conference orchestration service 611 receives a request for a new conference from a call router (e.g., the call router 631 of the communication platform 630). In some implementations, the interface 651 is a SIP interface and the request for a new conference is a SIP request. In some implementations, the application layer interface 653 of the conference state manager 612 receives a request for a new conference via an API request (e.g., of the API 632 of the communication platform 630). In some implementations, the interface 653 is an HTTP interface. In some implementations, the interface 653 is REST application program interface (API).

In some implementations, the process S1010 includes determining participants of the conference, as described above for S110 of FIG. 2. In some implementations, the conference state manager 612 manages conference state of the conference (e.g., the conference state 661), and the conference state (e.g., 661) indicates participants of the conference (e.g., as shown in FIG. 7). In some implementations, the conference state (e.g., 661) is stored by the conference database 614. In some implementations, the participants of the conference are specified by an API call received by the system 600. In some implementations, the participants of the conference are specified by an API call received by the application layer interface 653 of the conference state manager 612. In some implementations, each participant of the conference is identified by an endpoint identifier (e.g., a telephone number). In some implementations, the participants of the conference are specified by at least one conference request (e.g., a SIP request) received by the conference orchestration service 611 via the communication protocol interface 651.

In some implementations participants include at least one of: a participant transferred from an established communication session (e.g., a communication session of the communication platform 630) into the conference; a participant that establishes a communication session (e.g., a communication session of the communication platform 630) with an endpoint that is mapped to the conference (e.g., a conference of the conference system 600), and a participant specified by an API request received by the application programming interface (e.g., 653) of the conferencing system 600.

In some implementations, determining participants of the conference includes determining participant regions, as described above for S110 of FIG. 1. In some implementations, the conference orchestration service 611 determines the participant regions of each participant. In some implementations, the conference state manager 612 determines the participant regions of each participant. In some implementations, participant regions are specified by an API call received by the system 600. In some implementations, participant regions are specified by an API call received by the application layer interface 653 of the conference state manager 612. In some implementations, the participant regions of the conference are specified by at least one conference request (e.g., a SIP request) received by the conference orchestration service 611 via the communication protocol interface 651. In some implementations, participant regions of each participant of the conference are identified by respective endpoint identifiers (e.g., a telephone number) of the corresponding participant. In some implementations, participant regions of each participant are determined based on at least one of an area code and a country code of an endpoint (e.g., a telephone number) of the participant. For example, as shown in FIG. 7, participant regions for each of the participants P8, P9 and P11 of the conference 2 (represented by the conference 2 state 712) are determined to be "California, USA" based on the area code ("415") of the corresponding telephone numbers. Similarly, as shown in FIG. 7, participant regions for each of the participants P7 and P10 of the conference 2 (represented by the conference 2 state 712) are determined to be "London, England" based on the country code for England ("44") an the area code for London ("020") of the corresponding telephone numbers.

4.1.1 Application Layer Requests

In some implementations, responsive to the request for the new conference, the conference orchestration service 611 provides an application layer request (e.g., an HTTP request) to the conference state manager 612 (process S1011 of FIG. 10). In some implementations, responsive to the request for the new conference, the application layer interface 652 of the conference orchestration service 611 provides the application layer request to the application layer interface 654 of the conference state manager. In some implementations, the application layer request of the process S1011 specifies participants of the conference. In some implementations, the application layer request of the process S1011 specifies participant regions of the participants of the conference.

In some implementations, responsive to the application layer request of the process S1011, the conference state manager 612 determines participants of the conference, as described above. In some implementations, responsive to the application layer request of the process S1011, the conference state manager 612 determines participant regions of the participants of the conference, as described above.

In some implementations, responsive to the application layer request of the process S1011, the conference state manager 612 generates conference state for the conference (e.g., the conference state of FIG. 7). In some implementations, responsive to the application layer request of the process S1011, the conference state manager 612 generates conference state for the conference (e.g., the conference state of FIG. 7) and stores the generated conference state (e.g., as the conference state 661 of the conference database 614).

In some implementations, the conference state includes the determined participants and the determined participant regions of the participants for the conference.

In some implementations, responsive to the application layer request of the process S1011, the conference state manager 612 provides an application layer request (e.g., an HTTP request) to the mixer state manager (process S1012 of FIG. 10). In some implementations, responsive to the application layer request of the process S1011, the application layer interface 655 of the conference state manger 612 provides the application layer request to the application layer interface 656 of the mixer state manager 613. In some implementations, the application layer request of the process S1012 specifies participants of the conference. In some implementations, the application layer request of the process S1012 specifies participant regions of the participants of the conference.

In some implementations, responsive to the application layer request of the process S1012, the mixer state manager 613 allocates the mixers of the conference (process S1020).

4.2 Allocating Mixers

In some implementations, the process S1020 functions to control the system 600 to allocate mixers (e.g., the mixers 621*a-d*, 622*a-d*, and 623*a-d*) of the conference (e.g., a conference of the conference states 711, 712 and 713), the mixers being mixers of the set of distributed mixers (e.g., 620 of FIG. 6). Allocating mixers includes generating a mixer topology (e.g., a mixer topology of FIGS. 9A-D) that specifies an assignment of each determined participant (e.g., participants P1-P17 of FIGS. 7 and 9A-B) to at least one input channel (e.g., channels 1-6 of FIGS. 8 and 9A-D) of at least one mixer (e.g., the mixers 621*a-d*, 622*a-d*, and 623*a-d*) of the set of distributed mixers (e.g., 620). In some implementations, the mixer state manager 613 generates the mixer topology (e.g., one of the mixer topologies of FIGS. 9A-D). In some implementations, the mixer state manager 613 stores the mixer topology.

In some implementations the mixer state manager 613 allocates each determined participant to a single mixer. In some implementations, the mixer state manager 613 allocates the determined participants to multiple mixers to provide increased participant capacity for a conference (e.g., as shown in the mixer topology of FIG. 9B). In some implementations, the mixer state manager 613 allocates the determined participants to multiple mixers to provide a subset of the participants with regional mixing within the conference (e.g., as shown in the mixer topology of FIG. 9C). In some implementations, the mixer state manager 613 allocates mixers of the conference by bridging media of the conference between mixers of the set of distributed mixers. In some implementations, the mixer state manager 613 allocates mixers of the conference by bridging media such that a mixer output channel is mixed as an input to a different mixer. In some implementations, the mixer state manager 613 allocates mixers of the conference by allocating mixer output channels of at least two mixers to respective input channels of at least one mixer (e.g., as shown in the mixer topology of FIG. 9D).

In some implementations, responsive to the application layer request of the process S1012, the mixer state manager 613 allocates the mixers of the conference (process S1020).

In some implementations, the mixer state manager 613 assigns each determined participant to at least one input channel based on a participant region determined for the participant.

In some implementations, the application layer request of the process S1012 specifies the determined participants. In some implementations, the application layer request of the process S1012 specifies participant regions of the determined participants. In some implementations, the mixer state manager 613 determines participant regions of the determined participants, as described above.

In some implementations, the mixer state manager 613 assigns each determined participant to at least one input channel of at least one mixer system based on the mixer state 662. FIG. 8 depicts exemplary mixer state 662.

In some implementations, the mixer state manager 613 assigns each determined participant to at least one free input channel of at least one mixer system, and the mixer state manager 613 determines whether a mixer input channels is free based on the mixer state 662. In some implementations, the mixer state manager 613 updates the mixer state 662 after assignment of participants to input channels, to indicated that assigned channels are in use.

As an example, responsive to an application layer request provided by the conference state manager 612 for the conference corresponding to the conference state 711 (of FIG. 7), the mixer state manager 613 assigns participants P1-P6 to previously free channels of mixers 621a, 621b and 621c, and generates the mixer topology 910 of FIGS. 9A and 9B. As shown in FIGS. 9A and 9B, for the conference state 711, the mixer state manager 613 assigns the participants to channels 2 and 3 of mixer 621a, channels 2 and 3 of mixer 621b, and channels 3 and 4 of mixer 621c. The mixer state manager 613 assigns the output of the mixer 621a to channel 1 of mixer 621b, and assigns the output of the mixer 621b to channel 2 of mixer 621c. After assignment of the participants P1-P6 to the respective mixer channels, the mixer state 662 indicates the assigned channels as being used, as shown in FIG. 8. More specifically, mixer state 662 indicates channels 2 and 3 of mixer 621a, channels 1, 2 and 3 of mixer 621b, channels 2, 3 and 4 of mixer 621c as being in use.

In some implementations, the mixer state 662 indicates regions of each mixer (e.g., as shown in FIG. 8).

As an example, responsive to an application layer request provided by the conference state manager 612 for the conference corresponding to the conference state 712 (of FIG. 7), the mixer state manager 613 assigns participants P7-P11 to previously free channels of mixers 621d and 623a, and generates the mixer topology 920 of FIGS. 9A and 9C. As shown in FIGS. 9A and 9C, for the conference state 712, the mixer state manager 613 assigns the participants to channels 2, 3 and 4 of mixer 621d, and channels 3 and 4 of mixer 623a. The mixer state manager 613 assigns the output of the mixer 621d to channel 2 of mixer 623a. After assignment of the participants P7-P11 to the respective mixer channels, the mixer state 662 indicates the assigned channels as being used, as shown in FIG. 8. More specifically, mixer state 662 indicates channels 2, 3 and 4 of mixer 621d, and channels 2, 3 and 4 of mixer 623a as being in use. For the for the conference state 712, the mixer state manager 613 assigns the participants P8, P9 and P11 (which have "California, USA" as a participant region, e.g., as indicated by the "415" telephone number area code) to the mixer 621d, which is a mixer of region "California, USA" (as indicated by the mixer state 662), and the mixer state manager 613 assigns the participants P7 and P10 (which have "London, England" as a participant region, e.g., as indicated by the "44" country code and "020" telephone number area code) to the mixer 623a, which is a mixer of region "London, England" (as indicated by the mixer state 662).

As an example, responsive to an application layer request provided by the conference state manager 612 for the conference corresponding to the conference state 713 (of FIG. 7), the mixer state manager 613 assigns participants P12-P17 to previously free channels of mixers 621a, 621b and 622d, and generates the mixer topology 930 of FIGS. 9A and 9D. As shown in FIGS. 9A and 9D, for the conference state 713, the mixer state manager 613 assigns the participants to channels 5 and 6 of mixer 621a, channels 5 and 6 of mixer 621b, and channels 3 and 4 of mixer 622d. The mixer state manager 613 assigns the output of the mixer 621a to channel 1 of mixer 622d, and assigns the output of the mixer 621b to channel 2 of mixer 622d. After assignment of the participants P12-P17 to the respective mixer channels, the mixer state 662 indicates the assigned channels as being used, as shown in FIG. 8.

In some implementations, the mixer state manager 613 allocates mixers as described above for S120 of FIG. 2. In some implementations, the mixer state manager 613 allocates mixers based on at least one of communication quality, packet loss, latency, packet dial delay (PDD), monetary cost to the platform provider, monetary price charged to account holder, media quality, mixer capacity, regional associations of participants and mixers, participant priority, and the like.

In some implementations, the mixer state manager 613 stores the generated mixer topology.

In some implementations, the mixer state manager 613 provides the generated mixer topology (e.g., one of the topologies 910, 920, and 930 of FIG. 9A) to the conference state manager 612 (process S1021). In some implementations, the mixer state manager 613 provides the generated mixer topology to the conference state manager 612 via at least one of an application layer response and an application layer request. In some implementations, mixer state manager 613 uses the application layer interface 656 to provide the generated mixer topology to the application layer interface 655 of the conference state manager 612.

In some implementations, responsive to the mixer topology provided by the mixer state manager 613, the conference state manager 612 provides the mixer topology to the conference orchestration service manager 611 (process S1022). In some implementations, the conference state manager 612 provides the mixer topology to the conference orchestration service manager 611 via at least one of an application layer response and an application layer request. In some implementations, the conference state manager 612 provides the mixer topology to the conference orchestration service manager 611 uses the application layer interface 654 to provide the mixer topology to the application layer interface 652 of the conference orchestration service 611. In some implementations, the conference orchestration service 611 stores the topology (e.g., as one of the mixer topologies 663).

In some implementations, responsive to the mixer topology (e.g., received provided at the process S1022), the conference orchestration service 611 negotiates media across the allocated mixers (process S1030).

4.2.1 Bridging Mixers

In some implementations, the mixer bridging of two mixers is performed by the mixer state manager 613. In some implementations, the bridging of two mixers is performed by the mixer state manager 613 during generation of the mixer topology (e.g., 910, 920, 930), and the mixer state manager 613 bridges two mixers by instructing a main mixer (e.g., a mixer whose output is provided to an input of a child mixer) to dial in to a child mixer.

In some implementations, the mixer state manager 613 instructs the main mixer to dial in to the child mixer by providing an application layer request (e.g., an HTTP REST call) to the main mixer, the application layer request specifying the mixer identifier of the child mixer and the channel identifier of the channel to receive the output of the main mixer. In some implementations, responsive to the application layer request received by the main mixer, the main mixer dials into the child mixer and bridges the output of the main mixer to the input channel identified by the channel identifier by: providing the child mixer with a SIP INVITE message that specifies the main mixer in a SIP "From" header, specifies a mixer identifier of the child mixer as a parameter to the SIP INVITE message, and specifies the channel identifier of the channel in a custom SIP header (e.g., a SIP X-Header).

In some implementations, the mixer state manager 613 instructs the main mixer to dial in to the child mixer by providing an communication protocol interface request (e.g., a request provided by the communication protocol interface 657) (e.g., a SIP message) to the main mixer, the communication protocol interface request (e.g., SIP message) specifying the mixer identifier of the child mixer and the channel identifier of the channel to receive the output of the main mixer. In some implementations, responsive to the communication protocol interface request (e.g., SIP message) received by the main mixer, the main mixer dials into the child mixer and bridges the output of the main mixer to the input channel identified by the channel identifier by: providing the child mixer with a SIP INVITE message that specifies the main mixer in a SIP "From" header, specifies a mixer identifier of the child mixer as a parameter to the SIP INVITE message, and specifies the channel identifier of the channel in a custom SIP header (e.g., a SIP X-Header).

In some implementations, the bridging of two mixers, as described above, is performed by the conference orchestration service 611.

4.3 Negotiating Media

In some implementations, the process S1030 functions to control the system 600 to negotiate media across the allocated mixers (e.g., the mixer systems allocated at the process S1020). In some implementations, negotiating media across the allocated mixers includes routing media of each determined participant to the respective assigned mixer input channel. In some implementations, negotiating media across the allocated mixers includes starting the conference. In some implementations, the routing is performed by the conference orchestration service 611 in accordance with a signaling protocol.

In some implementations, the conference orchestration service 611 negotiates the media across the allocated mixers by routing media of each conference participant (e.g., participant media received from the call router 631 via the communication protocol interface 651) to a respective mixer input channel. In some implementations, the conference orchestration service 611 determines a mixer input channel for a conference participant based on the mixer topology generated by the mixer state manager 613 for the conference (e.g., a mixer topology of the topologies 663). In some implementations, the conference orchestration service 611 uses the communication protocol interface 651 to receive participant media from the communication platform 630 (e.g., from the call router 631). In some implementations, participant media is media of a communication session of the communication platform 630. In some implementations, the conference orchestration service 611 uses the communication protocol interface 651 to provide media of each participant of the conference to a respective mixer channel. In some implementations, the communication protocol interface 651 is a SIP interface, the conference orchestration service 611 uses the communication protocol interface 651 to receive participant media, and the conference orchestration service 611 uses the communication protocol interface 651 to provide media of each participant of the conference to a respective mixer channel.

In some implementations, negotiating the media across the allocated mixers includes the conference orchestration service 611 using the communication protocol interface 651 to perform signaling handshaking between media resources of the conference (e.g., participant media resources of the conference) and mixers allocated to the conference (as indicated by the mixer topology of the conference). In some implementations, the signaling handshaking is performed in accordance with SIP. In some implementations, the conference orchestration service 611 establishes the mixer topology by sending each mixer of the topology a SIP INVITE message that specifies at least a corresponding mixer identifier and a channel identifier assigned to the corresponding participant as indicated by the mixer topology (e.g., a topology of the mixer topologies 663). In some implementations, the conference orchestration service 611 establishes the mixer topology by sending each mixer of the topology a SIP INVITE message that specifies at least a corresponding conference participant, mixer identifier and a channel identifier assigned to the corresponding participant as indicated by the mixer topology (e.g., a topology of the mixer topologies 663).

In some implementations, the conference orchestration service 611 establishes the mixer topology by: determining conference participants (as described above); for each participant, determining the assigned mixer and channel as indicated by the mixer topology (e.g., one of the topologies 663) for the conference; for each participant, providing a SIP INVITE message to the assigned mixer. In some implementations, the SIP INVITE message specifies the conference participant in a SIP "From" header, specifies a mixer identifier of the mixer (as identified by the mixer topology) as a parameter to the SIP INVITE request, and specifies a channel identifier of the channel (as identified by the mixer topology) in a custom SIP header (e.g., a SIP X-Header).

As an example, for the conference 1 of the mixer topology 910 of FIGS. 9A and 9B, the conference orchestration service 611 routes media of participant P1 (received at interface 651, e.g., a SIP interface) to the channel 2 of the mixer 621*a* (e.g., by using SIP), routes media of participant P2 (received at interface 651) to the channel 3 of the mixer 621*a* (e.g., by using SIP), routes media of participant P3 (received at interface 651) to the channel 2 of the mixer 621*b* (e.g., by using SIP), routes media of participant P4 (received at interface 651) to the channel 3 of the mixer 621*b* (e.g., by using SIP), routes media of participant P5 (received at interface 651) to the channel 3 of the mixer 621*c* (e.g., by using SIP), and routes media of participant P6 (received at interface 651) to the channel 4 of the mixer 621*c* (e.g., by using SIP). The output of the mixer 621*a* is bridged to the channel 1 of the mixer 621*b*, the output of the mixer 621*b* is bridged to the channel 2 of the mixer 621*c*, and the bridging of the mixer outputs is performed as described above. The output of the mixer 621*c* is the output of the mixer topology 910, and therefore the output of the mixer 621*c* is provided by the mixer 621*c* to the conference orchestration service 611 (e.g., via SIP), and the conference orchestration service 611 provides the output of the mixer 621*c* to each conference participant via respective communication sessions (e.g., SIP communication sessions) (e.g., communication sessions of the call router 631).

5. METHOD OF FIG. 11

Figure 11:
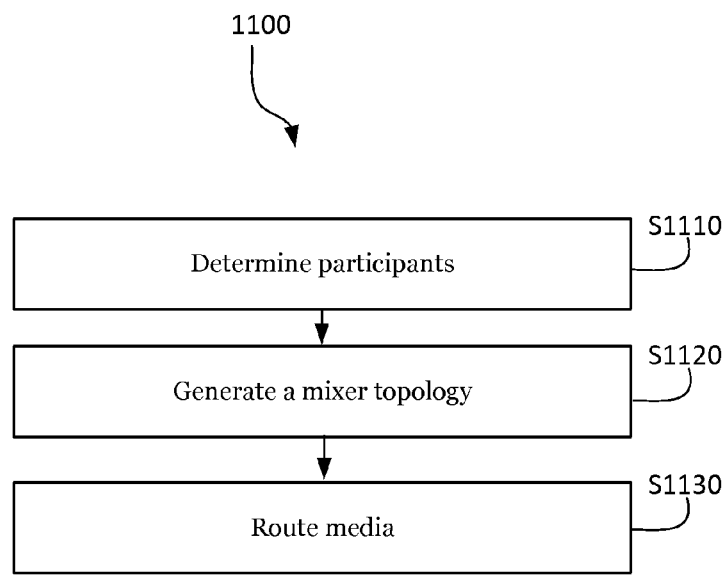
FIG. 11 is a process block diagram of a method of a preferred embodiment.

The method 1100 of FIG. 11 is performed at a conferencing system (e.g., 600 of FIG. 6) constructed to operate scalable conferencing services, the conferencing system including a conference orchestration service (e.g., 611), a conference state manager (e.g., 612), a mixer state manager (e.g., 613), and a set of distributed mixers (e.g., 620), and the method is performed responsive to a request for a new conference that is received via at least one of an application layer interface (e.g., 653) of the conferencing system and a signaling protocol communication interface (e.g., 651) of the conference orchestration service (e.g., 611). The method 1100 includes: determining participants of the conference and participant regions for each determined participant (process S1100), generating a mixer topology (e.g., a mixer topology of FIGS. 9A-D) by using the mixer state manager (e.g., 613), the mixer topology specifying an assignment of each determined participant to at least one input channel of a plurality of mixers of the set of distributed mixers (e.g., 620), the mixer state manager generating the mixer topology based on the determined participant regions and at least one regional association of a mixer of the set of distributed mixers (process S1120), and routing media of each determined participant to the assigned at least one input channel according to the generated mixer topology by using the conference orchestration service (e.g., 611) (process S1130). The mixer state manager (e.g., 613) generates the topology responsive to an application layer request provided by the conference state manager (e.g., 612), the conference state manager provides the application layer request responsive to an application layer request provided by the conference orchestration service (e.g., 611), the routing is performed by the conference orchestration service in accordance with a signaling protocol, and the conference orchestration service receives the generated mixer topology from the mixer state manager via the conference state manager.

In some implementations, the generated mixer topology is stored by the mixer state manager. In some implementations, the generated mixer topology is stored at the mixer state manager. In some implementations, the generated mixer topology is stored at a storage medium (e.g., 1205 of FIG. 12) of the system 600.

In some implementations, the system 600 performs the processes S1110-S1130. In some implementations, the conference orchestration service 611 (of FIG. 6) performs the process S1110. In some implementations, the mixer state manager 613 (of FIG. 6) performs the process S1120. In some implementations, the conference orchestration service 611 (of FIG. 6) performs the process S1130.

In some implementations, the process S1110 is similar to the process S1010 of FIG. 10. In some implementations, the process S1120 is similar to the process S1020 of FIG. 10. In some implementations, the process S1130 is similar to the process S1030 of FIG. 10.

In some implementations, the mixer state manager manages mixer state information for each mixer of the set of distributed mixers, and the mixer state information specifies a regional association of at least one mixer of the set of distributed mixers.

In some implementations, for each mixer managed by the mixer state manager, the mixer state information indicates a state for each input channel of the mixer. The mixer state manager assigns each determined participant to at least one free input channel of a plurality of mixers of the set of distributed mixers, and each free input channel is identified by the mixer state information.

In some implementations, the conference state is managed by the conference state manager, the conference state manger provides the conference state to the mixer state manager via the application layer request provided by the conference state manager, and the mixer state manager generates the mixer topology by using the conference state.

In some implementations, the mixer state manager determines the participant regions for each determined participant by using the conference state provided by the conference state manager. The mixer state manager determines regions for each mixer by using the mixer state managed by the mixer state manager. For at least one determined participant, the mixer state manager determines a mixer located in a region that matches the participant region of the determined participant, and the mixer state manager assigns the determined participant to an input channel of the mixer located in the matching region.

In some implementations, the mixer state manager assigns each determined participant to at least one input channel based on respective participant priority values.

6. SYSTEM ARCHITECTURE

Conference System

FIG. 12 is an architecture diagram of a system (e.g., the conference system 600 of FIG. 6) according to an implementation in which the system is implemented by a server device. In some implementations, the system is implemented by a plurality of devices. In some implementations, the system 600 is similar to the system 100 of FIG. 1.

The bus 1201 interfaces with the processors 1201A-1201N, the main memory (e.g., a random access memory (RAM)) 1222, a read only memory (ROM) 1204, a processor-readable storage medium 1205, a display device 1207, a user input device 1208, and a network device 1211.

The processors 1201A-1201N may take many forms, such as ARM processors, X86 processors, and the like.

In some implementations, the system (e.g., 600) includes at least one of a central processing unit (processor) and a multi-processor unit (MPU).

The processors 1201A-1201N and the main memory 1222 form a processing unit 1299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a conference management system, a conference orchestration service, a conference state manager, a mixer state manager, and a conference database, and mixing resources.

The network adapter device 1211 provides one or more wired or wireless interfaces for exchanging data and commands between the system (e.g., 600) and other devices, such as a mixer, and a communication platform (e.g., 630). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1222 (of the processing unit 1299) from the processor-readable storage medium 1205, the ROM 1204 or any other storage location. During execution of these software programs, the respective machine-executable instructions are accessed by at least one of processors 1201A-1201N (of the processing unit 1299) via the bus 1201, and then executed by at least one of processors 1201A-1201N. Data used by the software programs are also stored in the memory 1222, and such data is accessed by at least one of processors 1201A-1201N during execution of the machine-executable instructions of the software programs. The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 includes machine-executable instructions (and related data) for an operating system 1212, software programs 1213, device drivers 1214, mixing resources 1215, and the conference management system 610. The machine-executable instructions (and related data) for the mixing resources 1215 include machine-executable instructions (and related data) for one or more mixers (e.g., a mixer of the distributed mixing resources 620 of FIG. 6). The machine-executable instructions (and related data) for the conference management system 610 include machine-executable instructions (and related data) for the conference orchestration service 611, the conference state manager 612, the mixer state manager 613, and the conference database 614.

In some implementations, the conference management system 610 is implemented as a server device that is separate from server devices of the mixing resources.

7. SYSTEM ARCHITECTURE

Mixer Device

Figure 13:
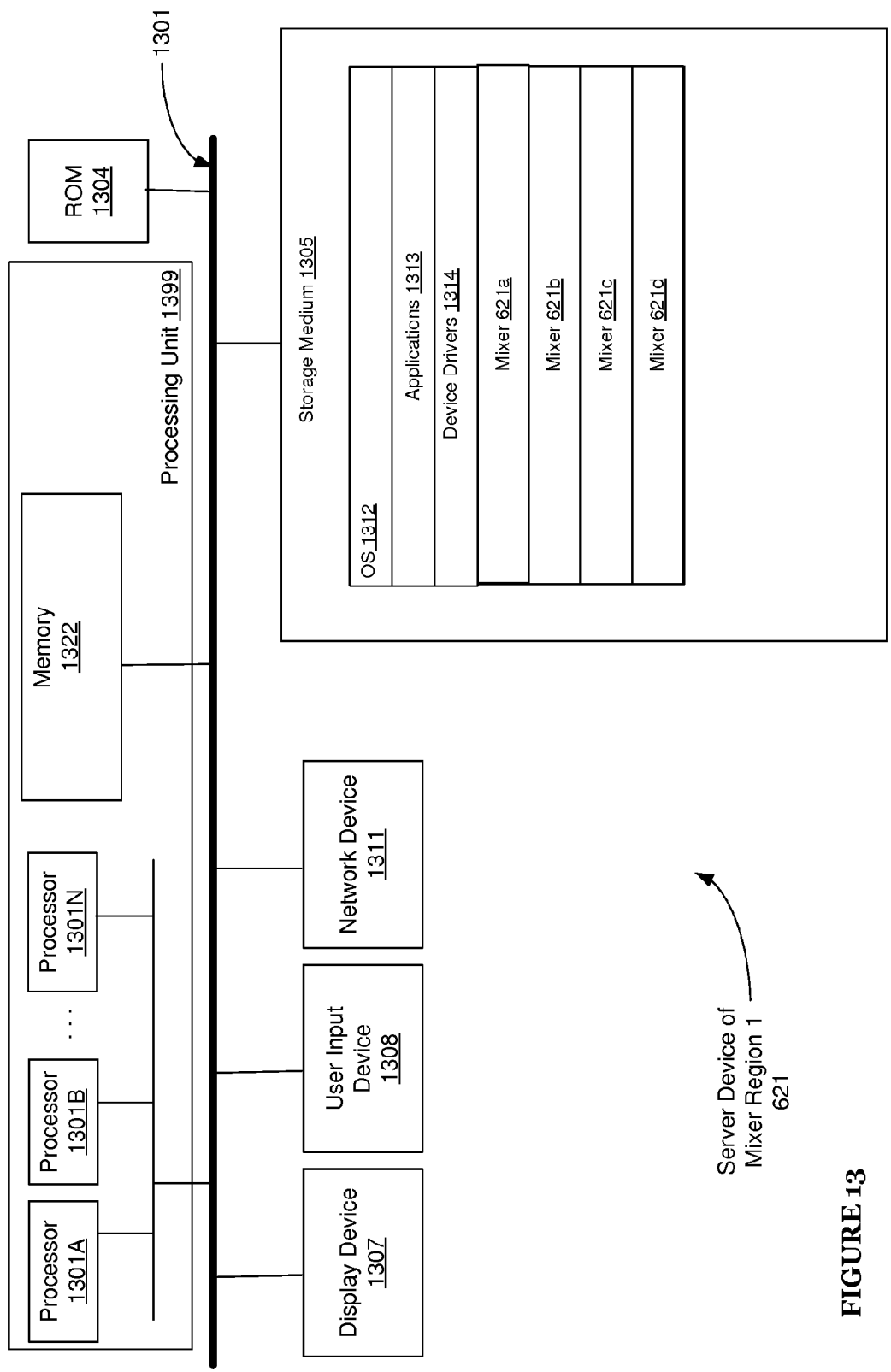
FIG. 13 is an architecture diagram of mixer system of a preferred embodiment.

FIG. 13 is an architecture diagram of a mixer region (e.g., the mixer region 621 of FIG. 6) according to an implementation in which the mixer region is implemented by a server device. In some implementations, the mixer region is implemented by a plurality of devices. In some implementations, the mixer region is similar to the mixer regions of 120 of FIG. 1.

The bus 1301 interfaces with the processors 1301A-1301N, the main memory (e.g., a random access memory (RAM)) 1322, a read only memory (ROM) 1304, a processor-readable storage medium 1305, a display device 1307, a user input device 1308, and a network device 1311.

The processors 1301A-1301N may take many forms, such as ARM processors, X86 processors, and the like.

In some implementations, the server device includes at least one of a central processing unit (processor) and a multi-processor unit (MPU).

The processors 1301A-1301N and the main memory 1322 form a processing unit 1399. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more mixers.

The network adapter device 1311 provides one or more wired or wireless interfaces for exchanging data and commands between the server device and other devices, such as a server device of a conference management system (e.g., 610). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1322 (of the processing unit 1399) from the processor-readable storage medium 1305, the ROM 1304 or any other storage location. During execution of these software programs, the respective machine-executable instructions are accessed by at least one of processors 1301A-1301N (of the processing unit 1399) via the bus 1301, and then executed by at least one of processors 1301A-1301N. Data used by the software programs are also stored in the memory 1322, and such data is accessed by at least one of processors 1301A-1301N during execution of the machine-executable instructions of the software programs. The processor-readable storage medium 1305 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1305 includes machine-executable instructions (and related data) for an operating system 1312, software programs 1313, device drivers 1314, and the mixers 621a-d.

8. MACHINES

The system and methods of the preferred embodiments and variations thereof can be embodied and/or implemented at least in part as a machine configured to receive a computer-readable medium storing computer-readable instructions. The instructions are preferably executed by computer-executable components preferably integrated with the media and signaling components of a conferencing system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

9. CONCLUSION

As a person skilled in the art will recognize from the previous detailed description and from the figures and claims, modifications and changes can be made to the preferred embodiments of the invention without departing from the scope of this invention defined in the following claims.

What is claimed is:
1. A method, comprising: at a conferencing system constructed to operate scalable conferencing services, the conferencing system including a conference orchestration service, a conference state manager, a mixer state manager, and a set of distributed mixers:
receiving a request for a new conference via at least one of application layer interface of the conferencing system and a signaling protocol communication interface of the conference orchestration service;
allocating mixers of the conference, the mixers being mixers of the set of distributed mixers; and
negotiating media across the allocated mixers,
wherein receiving a request for a new conference comprises determining participants of the conference,
wherein allocating mixers of the conference comprises:
generating a mixer topology that specifies an assignment of each determined participant to at least one input channel of at least one mixer of the set of distributed mixers,
wherein negotiating media across the allocated mixers comprises routing media of each determined participant to the assigned at least one input channel, and starting the conference,
wherein the media is routed according to the generated mixer topology, and
wherein the mixer state manager generates the topology responsive to an application layer request provided by the conference state manager, the conference state manager provides the application layer request responsive to an application layer request provided by the conference orchestration service, the routing is performed by the conference orchestration service in accordance with a signaling protocol, and the conference orchestration service receives the generated mixer topology from the mixer state manager via the conference state manager.

2. The method of claim 1, wherein the signaling protocol communication interface is a Session Initiation Protocol (SIP) interface.

3. The method of claim 1, wherein the conferencing system is a conferencing system of a communication platform, and the conference orchestration service receives the request for the new conference from a call router of the communication platform via the signaling protocol communication interface.

4. The method of claim 1, wherein participants include at least one of:
- a participant transferred from an established communication session into the conference;
- a participant that establishes a communication session with an endpoint that is mapped to the conference; and
- a participant specified by an API request received by the application layer interface of the conferencing system.

5. The method of claim 1, wherein allocating mixers of the conference comprises: bridging media of the conference between mixers of the set of distributed mixers.

6. The method of claim 1, wherein receiving a request for a new conference comprises determining participant regions of the determined participants.

7. The method of claim 6, wherein the conferencing system determines a participant region of a participant based on at least one of an area code and a country code of an endpoint of the participant.

8. The method of claim 7, wherein assigning each determined participant to at least one input channel of at least one mixer system of the set of distributed mixers comprises: assigning each determined participant to at least one input channel based on a participant region determined for the participant.

9. The method of claim 1, wherein the conference state manager is constructed to maintain conference state of the conference, and to notify the conference orchestration service of conference state changes via the application layer communication interface.

10. The method of claim 1, further comprising transitioning the mixer topology according to new conditions.

11. A method comprising: at a conferencing system constructed to operate scalable conferencing services, the conferencing system including a conference orchestration service, a conference state manager, a mixer state manager, and a set of distributed mixers:
- responsive to a request for a new conference that is received via at least one of application layer interface of the conferencing system and a signaling protocol communication interface of the conference orchestration service:
  - determining participants of the conference and participant regions for each determined participant;
  - generating a mixer topology by using the mixer state manager, the mixer topology specifying an assignment of each determined participant to at least one input channel of a plurality of mixers of the set of distributed mixers, the mixer state manager generating the mixer topology based on the determined participant regions and at least one regional association of a mixer of the set of distributed mixers; and
  - routing media of each determined participant to the assigned at least one input channel according to the generated mixer topology by using the conference orchestration service;
- wherein the mixer state manager generates the topology responsive to an application layer request provided by the conference state manager, the conference state manager provides the application layer request responsive to an application layer request provided by the conference orchestration service, the routing is performed by the conference orchestration service in accordance with a signaling protocol, and the conference orchestration service receives the generated mixer topology from the mixer state manager via the conference state manager.

12. The method of claim 11, wherein the mixer state manager manages mixer state information for each mixer of the set of distributed mixers, and wherein the mixer state information specifies a regional association of at least one mixer of the set of distributed mixers.

13. The method of claim 12, wherein for each mixer managed by the mixer state manager, the mixer state information indicates a state for each input channel of the mixer, and wherein the mixer state manager assigns each determined participant to at least one free input channel of a plurality of mixers of the set of distributed mixers, each free input channel being identified by the mixer state information.

14. The method of claim 11, wherein determining participants of the conference comprises: identifying participants specified in at least one of an application layer request and an application layer response received via the application layer interface.

15. The method of claim 11, wherein determining participants of the conference comprises: identifying participants specified in at least one conference request received via the signaling protocol communication interface of the conference orchestration service.

16. The method of claim 11, wherein the mixer state manager assigns each determined participant to at least one input channel based on respective participant priority values.

17. The method of claim 11, wherein responsive to an application layer request provided by the conference orchestration service, the conference state manger generates conference state of the conference based on information of the application layer request, and wherein the generated conference state includes the determined participants and the determined participant regions of the participants for the conference.

18. The method of claim 17, wherein the conference state is managed by the conference state manager, wherein the conference state manger provides the conference state to the mixer state manager via the application layer request provided by the conference state manager, and wherein the mixer state manager generates the mixer topology by using the conference state.

19. The method of claim 18,
wherein the mixer state manager determines the participant regions for each determined participant by using the conference state provided by the conference state manager,
wherein the mixer state manager determines regions for each mixer by using the mixer state managed by the mixer state manager, and
wherein, for at least one determined participant,
the mixer state manager determines a mixer located in a region that matches the participant region of the determined participant; and
assigns the determined participant to an input channel of the mixer located in the matching region.

20. A method comprising: at a conferencing system constructed to operate scalable conferencing services, the conferencing system including a conference orchestration service, a conference state manager, a mixer state manager, and a set of distributed mixers:
- responsive to a request for a new conference that is received via at least one of application layer interface of the conferencing system and a signaling protocol communication interface of the conference orchestration service:

determining participants of the conference;

generating a mixer topology by using the mixer state manager, the mixer topology specifying an assignment of each determined participant to at least one input channel of a plurality of mixers of the set of distributed mixers; and routing media of each determined participant to the assigned at least one input channel according to the generated mixer topology by using the conference orchestration service;

wherein the mixer state manager generates the topology responsive to an application layer request provided by the conference state manager, the conference state manager provides the application layer request responsive to an application layer request provided by the conference orchestration service, the routing is performed by the conference orchestration service in accordance with a signaling protocol, and the conference orchestration service receives the generated mixer topology from the mixer state manager via the conference state manager.

* * * * *